US007480780B2

(12) United States Patent
Kitamura

(10) Patent No.: US 7,480,780 B2
(45) Date of Patent: Jan. 20, 2009

(54) HIGHLY AVAILABLE EXTERNAL STORAGE SYSTEM

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 11/108,728

(22) Filed: Apr. 19, 2005

(65) Prior Publication Data

US 2006/0236054 A1 Oct. 19, 2006

(51) Int. Cl.
*G06F 12/00* (2006.01)
(52) U.S. Cl. ............................. 711/165; 711/154; 714/5; 714/6; 714/47
(58) Field of Classification Search .................. 711/114, 711/165, 154; 714/7, 5, 6, 47
See application file for complete search history.

(56) References Cited

U.S. PATENT DOCUMENTS

| | | | | |
|---|---|---|---|---|
| 6,219,676 | B1 * | 4/2001 | Reiner .......................... | 707/201 |
| 6,446,141 | B1 * | 9/2002 | Nolan et al. ................... | 710/8 |
| 6,721,841 | B2 | 4/2004 | Fukuzawa et al. | |
| 6,757,797 | B1 * | 6/2004 | Kaiya et al. .................. | 711/162 |
| 7,181,578 | B1 * | 2/2007 | Guha et al. ................... | 711/154 |
| 2002/0091898 | A1 * | 7/2002 | Matsunami et al. .......... | 711/114 |
| 2003/0088803 | A1 * | 5/2003 | Arnott et al. .................... | 714/5 |
| 2004/0030826 | A1 * | 2/2004 | Knapp .......................... | 711/112 |
| 2004/0049572 | A1 * | 3/2004 | Yamamoto et al. ........... | 709/224 |
| 2004/0123180 | A1 * | 6/2004 | Soejima et al. ................. | 714/5 |
| 2004/0128587 | A1 * | 7/2004 | Kenchammana-Hosekote et al. ............................ | 714/43 |
| 2004/0250017 | A1 * | 12/2004 | Patterson et al. ............ | 711/114 |
| 2004/0250161 | A1 * | 12/2004 | Patterson ........................ | 714/6 |
| 2005/0283655 | A1 * | 12/2005 | Ashmore ........................ | 714/7 |
| 2006/0112304 | A1 * | 5/2006 | Subramanian et al. .......... | 714/6 |

OTHER PUBLICATIONS

"IBM Introduces the SAN Volume Controller and San Integration Server", Evaluator Group, Inc., May 1, 2003, 4 pages.*
"Delivering on the Server/Storage Consolidation Promise", by Richard L. Villars and Dan Kusnetzky, Oct. 2003, IDC White Paper, 18 pages, www.idc.com.*
"IBM TotalStorage Enterprise Storage Server: A designer's view", by M. Hartung, IBM Systems Journal, vol. 42, No. 2, 2003.*
Partner Beyond Technology, Hitachi TagmaStore Universal Storage Platform, Hitachi Data Systems, Dec. 2004.

* cited by examiner

*Primary Examiner*—Matt Kim
*Assistant Examiner*—John P Fishburn
(74) *Attorney, Agent, or Firm*—Mattingly, Stanger, Malur & Brundidge, P.C.

(57) ABSTRACT

An information system includes a primary storage system (PSS), a host, an external storage system (ESS), and a management host. The PSS uses virtual devices to treat logical devices in the ESS as if they were logical devices in the PSS. The ESS logical devices are configured using multiple disks for providing redundancy, such as in a RAID configuration, to enable migration of data following hardware failure in the ESS. When a disk forming part of an ESS logical device fails, the management host detects the failure and judges whether the ESS logical device is used by the PSS to form a virtual device. If the ESS logical device is used to form a virtual device, then the management host issues a migration request. In response to the migration request, the PSS migrates data from the ESS logical device to a logical device in the PSS to avoid data loss.

25 Claims, 18 Drawing Sheets

| Group 501 | Disk 502 | RAID level 503 | Stripe size 504 |
|---|---|---|---|
| 1 | 1, 2, 3, 4 | 5 | 32KB |
| 2 | 5, 6, 7, 8 | 5 | 64KB |
| ⋮ | ⋮ | ⋮ | ⋮ |
| k | m, m+1 | 1 | - |

| Group 551 | LDEV 552 | Start 553 | End 554 |
|---|---|---|---|
| 0 | 0 | 0 | 0x77FFFFF |
| 0 | 1 | 0x7800000 | 0xC7FFFFF |
| ⋮ | ⋮ | ⋮ | ⋮ |
| 1 | 11 | 0 | 0x77FFFFF |
| 1 | 12 | 0x7800000 | 0xEFFFFFF |
| 1 | 13 | 0xF000000 | 0x13FFFFFF |
| ⋮ | ⋮ | ⋮ | |

| | 601 | 602 | 603 |
|---|---|---|---|
| | PORT | LUN | LDEV |
| | 31:02:c2:60:35:01 | 0 | 1 |
| | | 1 | 2 |
| | | ⋮ | ⋮ |
| | | k | m |
| | 31:02:c2:60:35:02 | ⋮ | ⋮ |

| 651 | 652 | 653 |
|---|---|---|
| Disk | Status | Spare Disk |
| 1 | OK | |
| 2 | OK | |
| 3 | NG | j |
| 4 | OK | |
| ⋮ | ⋮ | |
| j | REPLACE | |
| j+1 | REPLACE | |

| PORT | STATUS |
|---|---|
| 31:02:c2:60:35:01 | TARGET |
| 31:02:c2:60:35:02 | EXTERNAL |

FIG. 8

| LDEV | WWN | LUN |
|---|---|---|
| 301 | 10:04:e2:04:48:39 | 0 |
| 302 | 10:04:e2:04:48:39 | 1 |
| | | |

FIG. 9

|  | 551 | 552 | 553 | 554 | 555 |
|---|---|---|---|---|---|
|  | Group | LDEV | Start | End | Cache |
|  | 0 | 0 | 0 | 0x77FFFFF | 0 |
|  | 0 | 1 | 0x7800000 | 0xC7FFFFF | 0 |
|  | ⋮ | ⋮ | ⋮ | ⋮ |  |
|  | 1 | 11 | 0 | 0x77FFFFF | 0 |
|  | 1 | 12 | 0x7800000 | 0xEFFFFFF | 0 |
| 550' | 1 | 13 | 0xF000000 | 0x13FFFFFF | 1 |
|  | ⋮ | ⋮ | ⋮ |  |  |

FIG. 20

| 701 | 702 | 703 | 704 |
|---|---|---|---|
| LBA | BIT | LDEV | LBA |
| 0 | 0 | -1 | -1 |
| 1 | 1 | 13 | 0 |
| 2 | 1 | 13 | 1 |
|  |  |  |  |
| N | 0 | -1 | -1 |

HIGHLY AVAILABLE EXTERNAL STORAGE SYSTEM

BACKGROUND OF THE INVENTION

The present invention relates generally to managing the availability of data in a storage system. More particularly the present invention relates to a method, apparatus and computer program for managing the availability of data in an external storage system such that the data remains in a highly available state even if a failure occurs in the external storage system.

Storage virtualization is the software implementation that combines multiple network storage devices into what appears to be a single storage unit. Storage virtualization is used, for example, in a Storage Area Network (SAN) which is a high-speed sub-network of shared storage devices. The SAN makes tasks such as archiving, back-up, and recovery easier and faster. Examples of storage virtualization are provided by U.S. Pat. No. 6,721,841 and "TagmaStore Universal Storage Platform", Hitachi Data Systems Corporation, December 2004

U.S. Pat. No. 6,721,841 discloses a kind of virtualization method in which Input/Output (I/O) subsystems A and B are connected via a communication link. When the I/O subsystem A receives a read request from a host, the request is converted so as to read data in the I/O subsystem B. The data read from I/O subsystem B by I/O subsystem A is then supplied to the host from I/O subsystem. Thus, from the host point of view the data is being retrieved from I/O subsystem A.

"TagmaStore Universal Storage Platform" discloses a storage virtualization function in which a plurality of storage systems connected to the TagmaStore Universal Storage Platform are presented as if they were just internal storage devices.

A disadvantage of conventional storage virtualization is that the storage system enabling virtualization (primary storage system) cannot manage hardware failures that may occur in external storage systems such as hard disk drives. Therefore, in conventional storage virtualization if the external storage systems are not as reliable as the primary storage system, then data in the external storage systems may be lost even though the primary storage system is very reliable.

SUMMARY OF THE INVENTION

The present invention provides a method, apparatus and computer program for managing the availability of data in an external storage system such that the data remains in a highly available state even if a failure occurs in the external storage system.

An information system according to the present invention includes a primary storage system, a host, at least one external storage system, and a management host. Each of the primary and external storage systems may be a different kind of storage system (e.g. manufactured by the different vendors) from the other storage system. The primary storage system treats logical devices in the external storage system as if they were logical devices in the primary storage system. When a disk that forms at least a part of a logical device in the external storage systems fails, the management host detects the failure and judges whether the logical device is used by the primary storage system to form a virtual device. If the logical device is used by the primary storage system to form a virtual device, then the management host issues a migration request to the primary storage system. In response to the migration request, the primary storage system migrates data from the logical device of the external storage system in which the disk failed to a logical device in the primary storage system to avoid data loss, such as might occur due to loss of redundancy and in the event of failure of another disk forming at least part of the logical device in the external storage system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 4 is a diagram for explaining a RAID Configuration Table 500 according to an embodiment of the present invention;

FIG. 5 is a diagram for explaining a Logical Device Configuration Table 550 according to an embodiment of the present invention;

FIG. 6 is a diagram for explaining a Path Configuration Table 600 according to an embodiment of the present invention;

FIG. 7 is a diagram for explaining a Disk Status Table 650 according to an embodiment of the present invention;

FIG. 8 is a diagram for explaining a Port Configuration Table 400 according to an embodiment of the present invention;

FIG. 9 is a diagram for explaining a Virtual Device Configuration Table 250 according to an embodiment of the present invention;

FIG. 20 is a diagram for explaining a Logical Device Configuration Table 550' according to the still yet another embodiment of the present invention;

FIG. 21 is a diagram for explaining a Cache Bitmap 700' defined when a virtual device 272 is defined according to the still yet another embodiment of the present invention;

DETAILED DESCRIPTION OF THE INVENTION

The present invention, as will be described in greater detail below provides an apparatus, method and computer program, particularly, for example, a method, apparatus and computer program for managing the availability of data in an external storage system such that the data remains in a highly available state even if a failure occurs in the external storage system. The present invention provides various embodiments including $1^{st}$, $2^{nd}$ and $3^{rd}$ embodiments as described below. However it should be noted that the present invention is not limited to the embodiments described herein, but could extend to other embodiments as would be known or as would become known to those skilled in the art.

1. $1^{st}$ Embodiment

A. System Configuration

Figure 1:
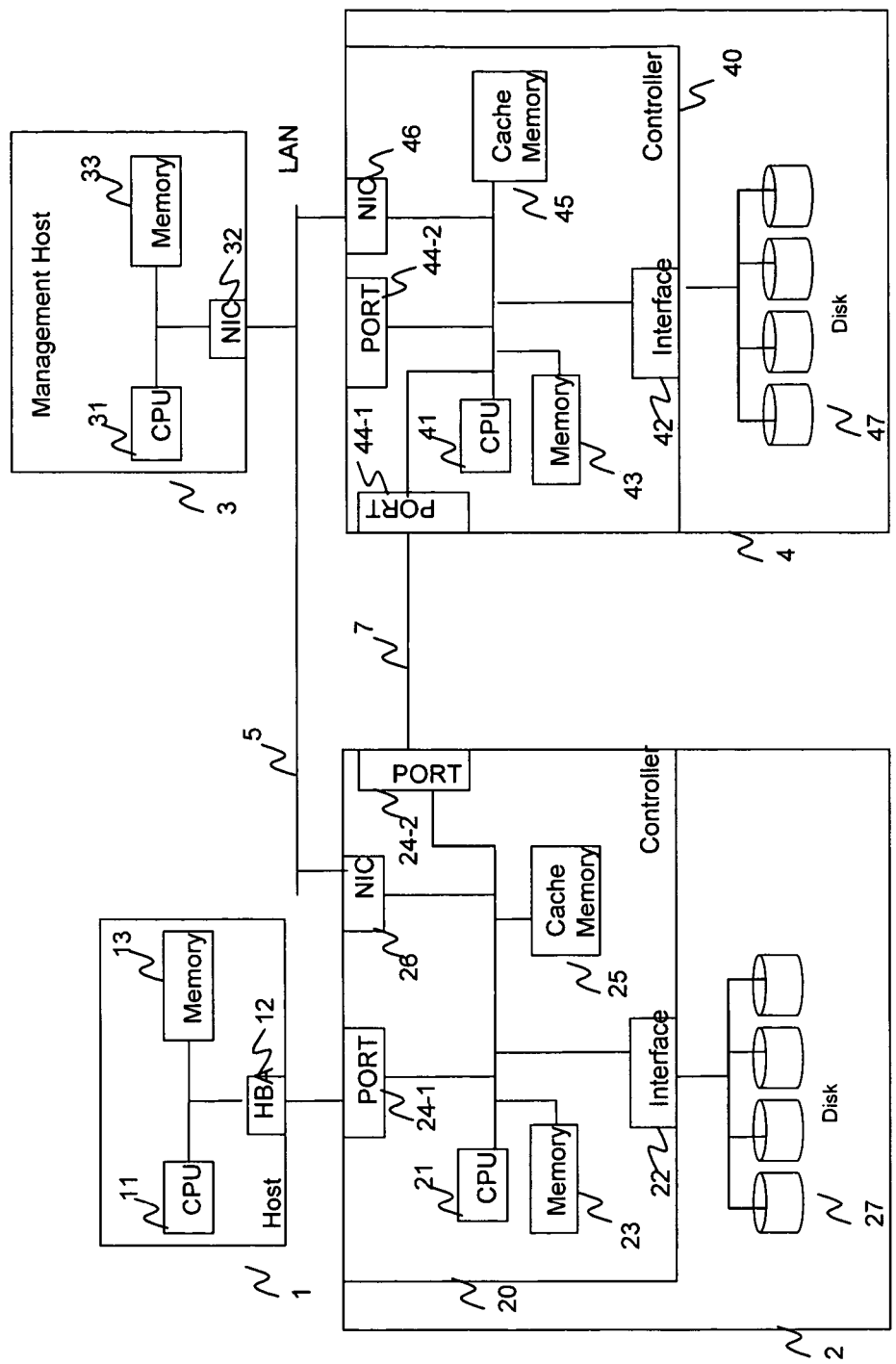
FIG. 1 illustrates an example of physical components of an information system according to an embodiment of the present invention.
Figure 2:
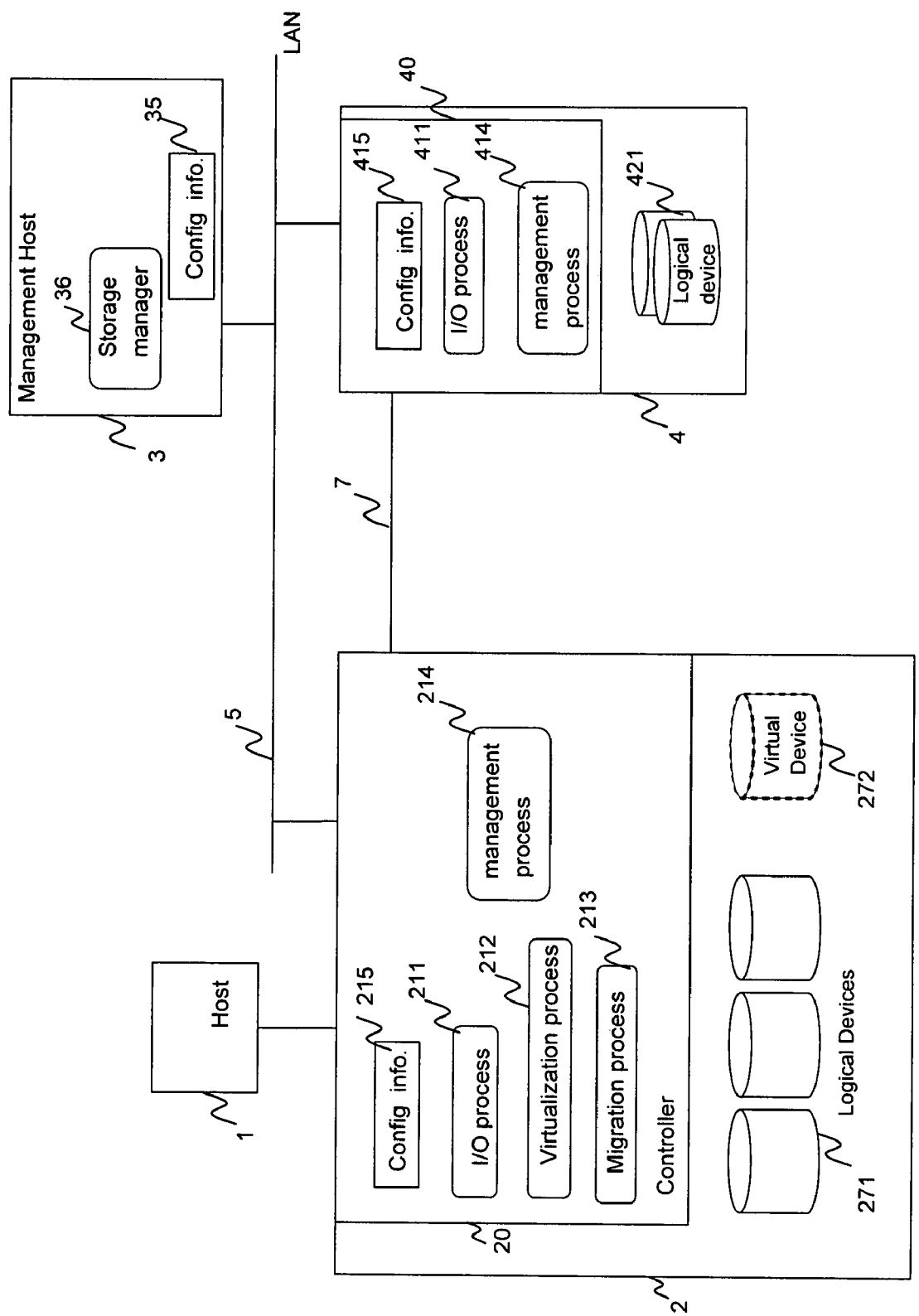
FIG. 2 illustrates an example of logical components that form the information system of FIG. 1 according to an embodiment of the present invention.

FIG. 1 and FIG. 2 show an example of an information system in which the method, apparatus and computer program of the present invention is applied. Particularly, FIG. 1 shows the physical components and FIG. 2 shows the logical components that are used in the present embodiment.

As illustrated in FIG. 1 a host 1 includes a Central Processing Unit (CPU) 11, a memory 13 and a Host Bus Adapter (HBA) 12. A primary storage 2 is provided that includes a disk controller 20 and a plurality of disks 27. Disk controller 20 includes a Central Processing Unit (CPU) 21, a backend interface 22, a memory 23, a plurality of ports 24-1 and 24-2, a cache memory 25, and a network interface card (NIC) 26. The ports 24-1 and 24-2 (generally called "ports 24") may be used for connecting with HBA 12 of host computer 1 or an external storage 4. The ports 24 may be of the Fibre Channel, Ethernet, or other interface type. The number of ports 24 is not limited to two. More than two ports 24 may exist. The NIC 26 is used for communicating with elements connected to a Local Area Network (LAN) 5. Thus, the NIC 26 could be of the Ethernet type for use with the LAN 5. It is possible that another kind of medium may be used for conducting communications in place of the LAN 5.

Figure 16:
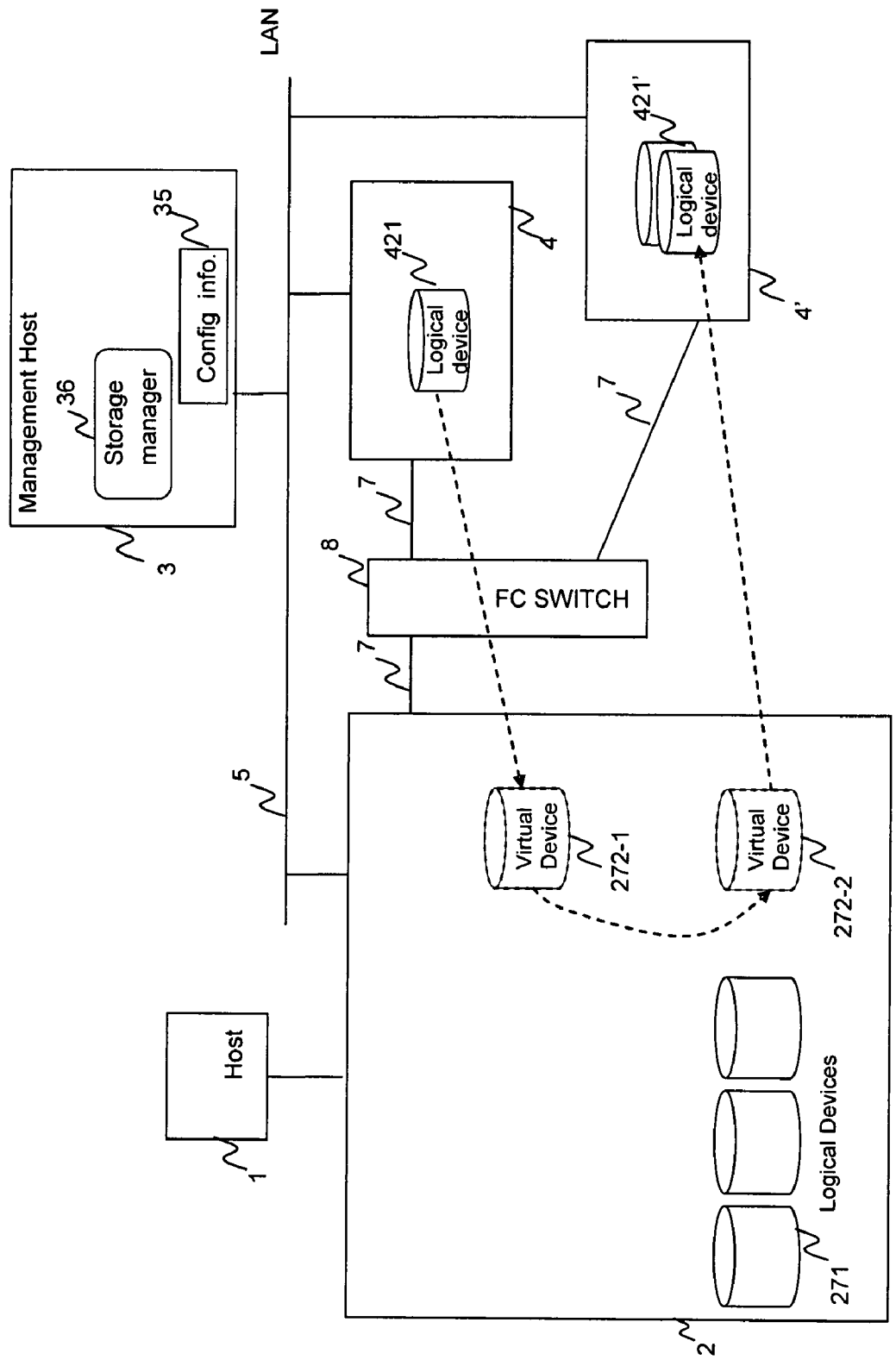
FIG. 16 illustrates an example of physical components of an information system having two external storage systems according to another embodiment of the present invention.

An external storage 4, similar to the primary storage 2, is also provided. The external storage 4 includes a disk controller 40 and a plurality of disks 47. Disk controller 40 includes a Central Processing Unit (CPU) 41, a backend interface 42, a memory 43, a plurality of ports 44-1 and 44-2, a cache memory 45, and a network interface card (NIC) 46. Port 44-1 may be used for connecting with primary storage 2. The ports 44 may be of the Fibre Channel, Ethernet, or other interface type. The NIC 46 is used for communicating with elements connected to LAN 5. Thus, the NIC 46 could be of the Ethernet type for use with the LAN 5. A plurality of external storages 4 can be provided in the information system as illustrated in FIG. 16 as will be discussed below.

A management host 3 is provided in the information system that is used for managing the primary storage 2 and the external storage 4, to configure logical devices, to monitor the operation of various hardware components of the storages, to detect failures in the hardware components, and so on. Management host 3 includes a CPU 31, a memory 33 and a NIC 32 for enabling communication with LAN 5.

The LAN 5 is used by the management host 3 to communicate with and thereby manage the primary storage 2 and the external storage 4. A data transmission line 7 is provided for connecting the external storage 4 to the primary storage 2. In the present embodiment, for example, the primary storage 2 issues an Input/Output (I/O) command to the external storage 4 via the data transmission line 7 in accordance with the Fibre Channel protocol. The external storage 4 can respond to such I/O command using the data transmission line 7.

FIG. 2 shows a functional diagram of the information system, the physical configuration of which is illustrated in FIG. 1. FIG. 2 illustrates the functions in the form of processes and a manager that reside in the primary storage 2, the external storage 4 and the management host 3. The processes include I/O process 211, virtualization process 212, migration process 213 and management process 214 included in the controller 20 of the primary storage 2, and I/O process 411 and management process 414 included in the controller 40 of the external storage 4. The manager includes a storage manager 36 included in the management host 3. The processes and the manager as illustrated in FIG. 2 each can, for example, be implemented by hardware and/or computer programs. If implemented by computer programs each of the processes and the manager can, for example, correspond to computer program code or instructions executed by a processor.

As described above the storage manager 36 resides in the management host 3 and the processes 211-214 reside in the disk controller 20. Thus, for example, if the storage manager 36 is a computer program, then the computer program could be stored in memory 33 of the management host 3 and executed by CPU 31 of the management host 3. Further, for example, if the processes 211-214 are computer programs, then the computer programs could be stored in the memory 23 and executed by the CPU 21 of primary storage 2.

The I/O process 211 processes host I/O requests from host 1. The I/O process 211 also creates logical devices 271 from the plurality of disks 27. Details will be described below.

The virtualization process 212 creates virtual devices 272 in primary storage 2 using logical devices 421 created in the external storage 4 using disks 47. By using the virtualization process 212, the disk controller 20 treats the logical device 421 in the external storage 4 as if it were a logical device in the primary storage 2.

The migration process 213 copies data in a logical device 271 in the primary storage 2 to another logical device 271 in the primary storage 2 while receiving host I/O requests. The logical devices to and from which the data is copied may also be virtual devices 272. Details of the above will be described below in connection with FIGS. 13-15.

The management process 214 communicates with storage manager 36 in the management host 3 and operates the processes in the disk controller 20 in accordance with instructions from the storage manager 36.

In the external storage 4, I/O process 411, and management process 414 reside in the disk controller 40. The management process 414 monitors the status of hardware components of the external storage 4 such as disks 47. If a failure occurs in one of the disks 47, the management process 414 notifies the failure to the storage manager 36 in the management host 3.

Also, to manage logical devices and virtual devices, disk controllers 20, 40, and management host 3 manages configuration information 215, 415, and 35 respectively. Details of the configuration information 215, 415, and 35 are described below.

B. Logical Volume Configuration

In the present embodiment, external storage 4 constructs a Redundant Array of Inexpensive Disks (RAID) configuration using the plurality of disks 47. Within the RAID configuration, one or more logical devices 421 are created. Also, primary storage 2 constructs a RAID configuration and maintains a plurality of logical devices 271 using disks 27. However, in another embodiment, the external and primary storages 4 and 2, respectively, do not necessarily construct a RAID configuration.

Figure 3:
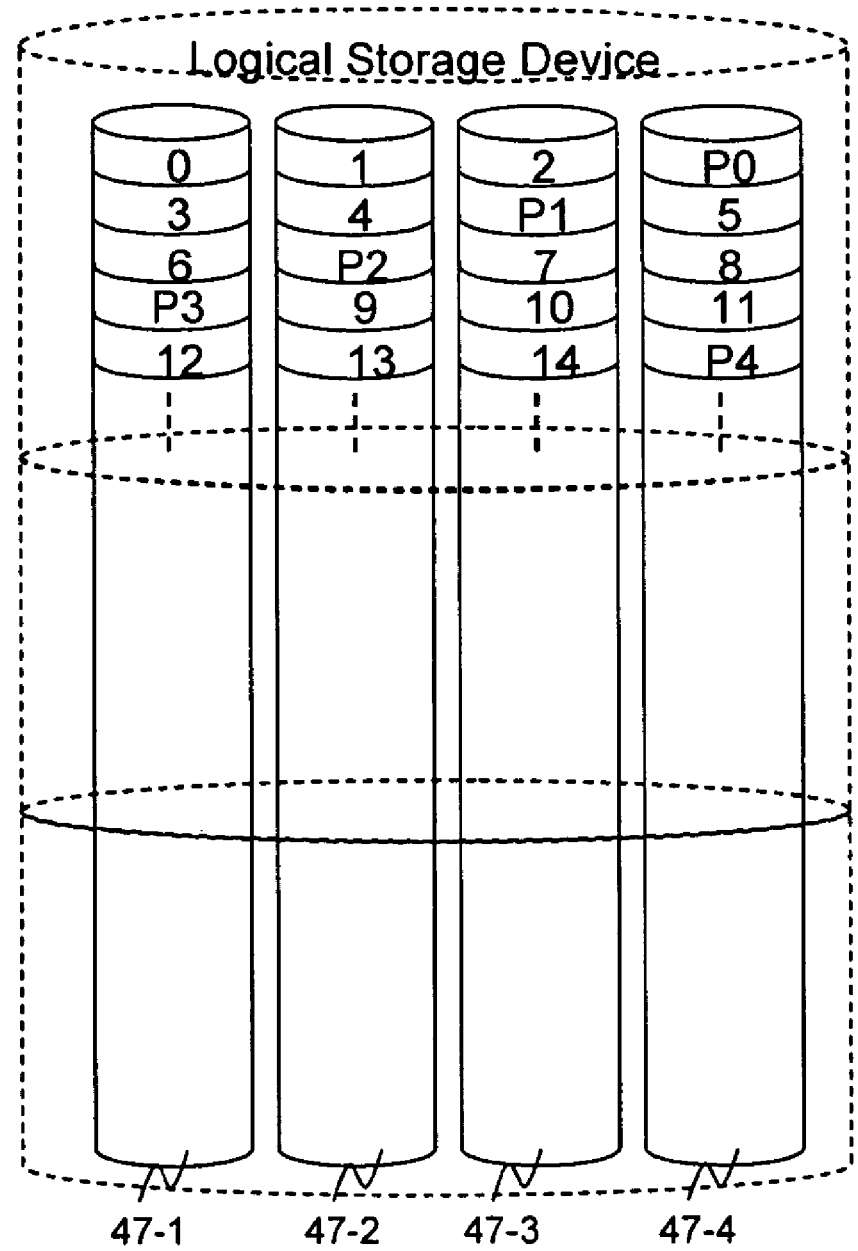
FIG. 3 illustrates an example of a logical storage device formed by a plurality of disks that construct a Redundant Array of Inexpensive Disks (RAID) 5 configuration according to an embodiment of the present invention.

The followings are terms and definitions that are used to describe features of the present embodiment:

RAID group: A set of disks 47 that construct a RAID configuration is called RAID group. In FIG. 3, a set of disks 47-1, 47-2, 47-3, and 474 that construct a RAID-5 configuration are managed as a RAID group.

Stripe: Each storage device has a plurality of fixed-length regions where data is stored. In the present embodiment, a fixed-length region is called a stripe. The length of the stripe is defined in a RAID Configuration Table 500 as illustrated in FIG. 4, the details of which are described below. The length of a stripe is multiples of a disk block which is usually 512 bytes. FIG. 3 illustrates an example of a RAID group that constructs a RAID-5 configuration. In FIG. 3 small blocks having identification numbers 1, 2, 3, etc. and P1, P2, P3, etc. are stripes. If the size of each small block is 512 bytes, the stripe size of the RAID group could, for example, be 512 bytes.

Stripe number: Each stripe has its own unique identification number in the present embodiment. Thus, numerals 1, 2, 3 . . . x each identify a data stripe within which data is stored. Further, letters P1, P2 . . . Px each identify a parity stripe within which parity is stored.

Logical device (LDEV): At least one logical device is formed by the management process 414 from a RAID group based on the disks 47 which are not shown to the host computers. FIG. 3 shows an example of three logical devices being formed in a RAID group.

Logical device number: Each logical device has a unique number within each storage system, namely the primary storage 2 and the external storage 4, so that the storage system can manage the logical device. The unique number is called a logical device number. Also, each virtual device, described below, in the primary storage 2 has logical number.

Port number and Logical Unit Number (LUN): When host 1 writes data (object) to a logical device in the primary storage 2, it designates the logical device by specifying identification numbers of the logical device in accordance with the protocol that is used between the host 1 and the primary storage 2. If data transmission between the host 1 and the primary storage 2 is in accordance with Fibre Channel, then two kinds of identification numbers are used, namely port number and Logical Unit Number. In the present embodiment, port number corresponds to World Wide Name (WWN) of Fibre Channel that is assigned to each port 24 and LUN is a unique identifier assigned to each logical device. By specifying these two identification numbers, one logical device is determined. Therefore, to enable host 1 to access particular logical devices, a port number and a LUN must be specified.

Disk number: The primary storage 2 and the external storage 4 manage the disks 27 and 47 by assigning a unique number to each disk. These unique numbers assigned to the disks are called disk numbers.

In FIG. 4, for example, information regarding a first RAID group (group 1) is provided in a RAID Configuration Table 500. The details of the RAID Configuration Table 500 are described below.

C. External Storage Connecting Function

The virtualization process 212 causes the primary storage 2 to form a virtual device 272 using the logical devices 421 in the external storage 4. This function is hereinafter called the external storage connecting function.

The following are terms and definitions used in describing this embodiment:

Internal device: is a logical device 271 that resides in the primary storage 2.

External device: is a logical device 421 that resides in the external storage 4.

Virtual device: is a device formed based on at least one logical device 421 that exists in the external storage 4. Each virtual device 272 is associated with one of the external devices of the external storage 4. In another embodiment, some of a plurality of virtual devices 272 may be associated with more than one logical device 421 of the external storage 4 to construct large size virtual devices 272.

Map external device to virtual device: "Map" means that the virtualization process 212 creates a virtual device 272 in the primary storage 2 associated with a logical device 421 of the external storage 4. After the mapping procedure, when the host 1 issues an I/O request to the virtual device 272, the virtualization process 212 translates the I/O request and issues the I/O request to the logical device 421 of the external storage 4 associated with the virtual device 272 according to the map.

D. Configuration Information

FIGS. 4-9 show a series of tables containing information used to define the configuration of the storages. The information contained in the tables represents configuration information 215, 415, or 35 as illustrated in FIG. 2.

FIG. 4 shows the structure of a RAID Configuration Table 500 of a RAID group (group 1) having a plurality of entries or rows. Primary storage 2 and external storage 4 each maintain this table to manage their disks 27 and 47 respectively. In the RAID Configuration Table 500 each row contains information of each RAID group. Columns 501, 502, 503 and 504 of the RAID Configuration Table 500 respectively contain a RAID group number of each group, disk numbers that identify disks that correspond to each group, a RAID level for each group and stripe size information of a size of a stripe corresponding to each group. A stripe is a number of consecutively addressed blocks in a disk device within which data is stored.

The RAID group number 501 identifies each RAID group with a unique number within the storage system. Disk number 502 indicates disk numbers that construct the RAID group. Thus, for example, the RAID group 1 (the row whose Group 501 is 1) is composed of four disks, disk 1, 2, 3, and 4. RAID level 503 represents the RAID level being implemented in the group. Thus, RAID 1 through 6 are supported. Stripe size 504 indicates the stripe size of the RAID group.

FIG. 5 shows the structure of a Logical Device (LDEV) Configuration Table 550 having a plurality of entries or rows. The LDEV Configuration Table 550 is used to define the configuration of logical devices in the storage system. In the Logical Device Configuration Table 550 each row contains information regarding the logical devices of each RAID group. Columns 551, 552, 553 and 554 of the logical Device Configuration Table 550 respectively contain a RAID group number of each group, logical device numbers that identify logical devices that correspond to each group, starting stripe information indicating a stripe at which the logical device begins and ending stripe information indicating a stripe at which the logical device ends.

The RAID group number 551 identifies each RAID group with a unique number within the storage system. LDEV number 552 is an identification number of a logical device in the RAID group. Each LDEV number is a unique number within the storage system. Start 553 and End 554 are two parameters which show the starting stripe number and ending stripe number in the RAID group that construct the logical device. For example, LDEV 1 (the second row) starts from stripe number 0x7800000 and ends at stripe number 0xC7FFFFF.

FIG. 6 shows the Path Configuration Table 600 having a plurality of entries or rows. The Path Configuration Table 600 defines the path to be used to access a particular logical device. In the Path Configuration Table 600 each row contains information regarding the path which must be set for in an I/O request to access a particular logical device. Columns 601, 602 and 603 of the Path Configuration Table 600 respectively contain port IDs identifying ports through which particular logical devices are to be accessed, Logical Unit Number (LUN) which are renumbered IDs of the particular logical devices and LDEV which identifies the particular logical devices.

Port 601 and LUN 602 are two parameters that when specified in an I/O request causes access to a particular LDEV. Thus, for example, when host 1 issues an I/O request to the primary storage 2 specifying a Port and LUN, the primary storage 2 permits access to the LDEV corresponding to the Port and LUN. LDEV 603 identifies by number particular logical devices.

FIG. 7 shows a Disk Status Table 650 having a plurality of entries or rows. The Disk Status Table 650 provides information regarding the status of each of the disks of the storage system, particularly with regard to whether the disk has failed and been replaced. In the Disk Status Table 650 each row contains information regarding the status of a particular disk and its corresponding spare disk. Columns 651, 652 and 653 of the Disk Status Table 650 respectively contain disk numbers that identify particular disks, information indicating the status of the disk and information regarding the spare disks corresponding to the disks.

Disk 651 shows disk numbers. Status 652 and Spare Disk 653 show the status of the disks 27 or 47 specified in the column 651, wherein "OK" indicates that a corresponding disk 27 or 47 is operating normally, "NG" indicates that a corresponding disk 27 or 47 has failed, and "REPLACE" indicates that a corresponding disk 27 or 47 is a hot standby disk and will be used as a replacement disk when another disk 27 or 47 fails.

Disk controller 20 or 40 periodically checks the status of each disk 27 or 47 and manages the disk status table 650 to update the status of each disk when its status changes. Thus, when one of the disks 27 or 47 fails, disk controller 20 or 40 changes the status of the disk 27 or 47 into "NG", and assigns one of the replacement disks, whose status is "REPLACE", as a replacement disk. When disk controller 20 or 40 assigns a replacement disk, the disk controller 20 or 40 records the disk number in the column Spare Disk 653 to indicate which of the disks is being used as the replacement disk of the failed disk. The Disk Status Table 650 as shown in FIG. 7 shows that disk controller 20 or 40 has assigned the disk number "j" as the replacement disk of the disk 3 since the disk 3 has failed.

Figures 8, 9:
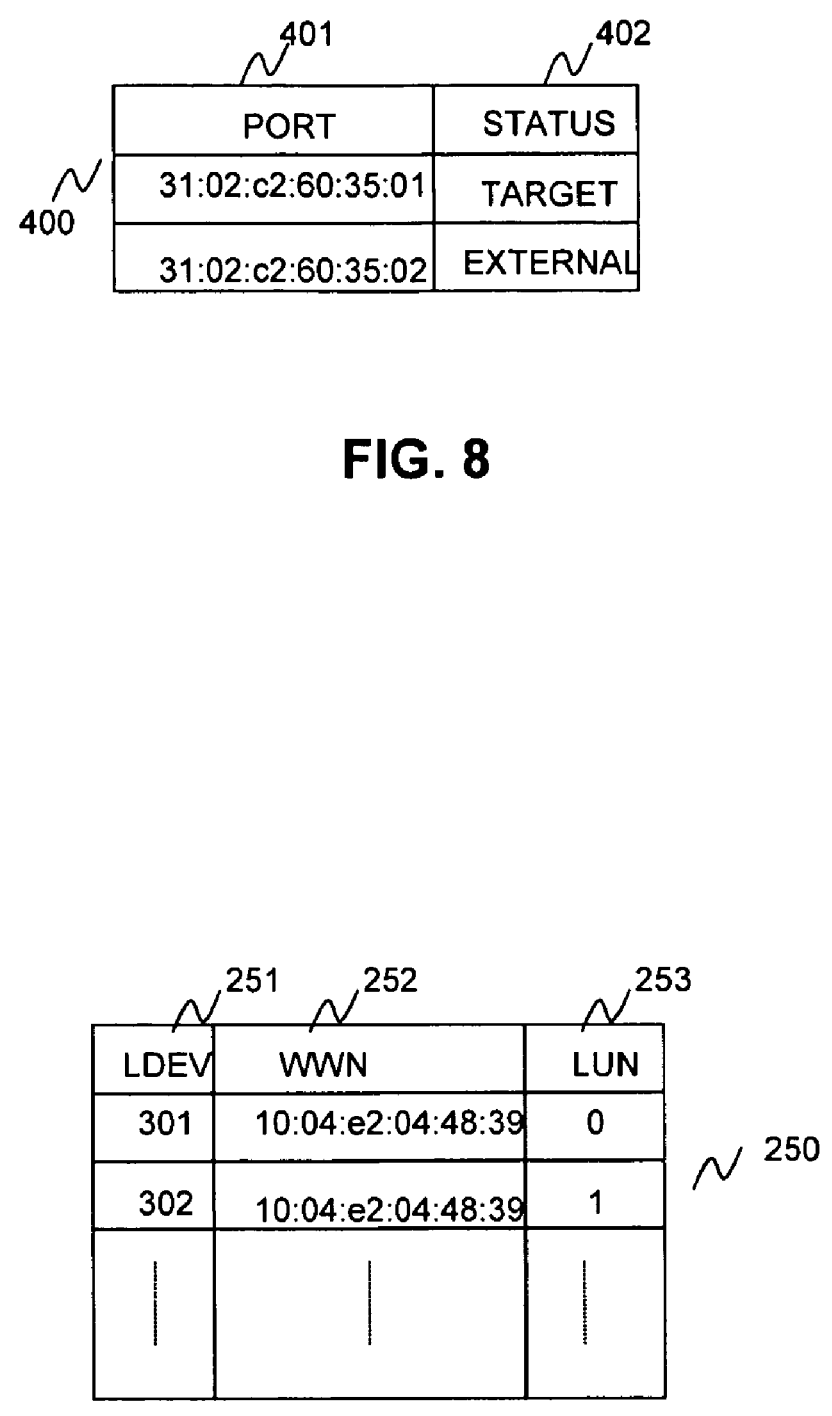

FIG. 8 is a Port Configuration Table 400 having a plurality of entries or rows. The Port Configuration Table 400 defines the configuration of the ports of the primary storage 2, wherein for example, each Fibre Channel (FC) interface (I/F) (port) has one of two kinds of configurations. In the Port Configuration Table 400 each row contains information regarding the configuration of each port. Columns 401, and 402 of the Port Configuration Table 400 respectively contain port IDs identifying ports to which a particular configuration is to be applied and information regarding the state of the current configuration of the ports.

Port 401 shows port IDs of particular ports. Status 402 shows the status of the configuration of the particular as having at least two states of configuration, namely TARGET AND EXTERNAL. TARGET indicates that the corresponding port is a FC I/F and is used for receiving host I/O requests. EXTERNAL indicates that the corresponding port is a FC I/F and is used for an external storage connecting function.

Thus, in FIG. 8 according to the Port Configuration Table 400, in the primary storage 2, the first row having port number 31:02:c2:60:35:01 corresponds to the FC I/F 24-1, and the second row having port number 31:02:c2:60:35:02 corresponds to the FC I/F 24-2. Therefore, FC I/F 24-1 is used for receiving host I/O requests, and FC I/F 24-2 is connected to the external storage 4 to use the external storage connecting function described above. Since the Port Configuration Table 400 is related to the virtualization process 212, it is not maintained in the external storage 4.

FIG. 9 shows a Virtual Device Configuration Table 250 having a plurality of entries or rows. The Virtual Device Configuration Table 250 maps virtual devices 272 of the primary storage 2 to logical devices 421 of the external storage 4. Thus, when a virtual device 272 is mapped to an external logical device 421, information of the mapping is registered in the Virtual Device Configuration Table 250. Since the Virtual Device Configuration Table 250 is used by the virtualization process 212, it is maintained, for example, by the primary storage 2. In the Virtual Device Configuration Table 250 each row contains information regarding the mapping of each virtual device 272 to a logical device 421. Columns 251, 252 and 253 of the Virtual Device Configuration Table 250 respectively contain logical device numbers of the virtual devices 272 and information of the logical devices 421 corresponding to the virtual devices 272.

LDEV 251 shows the LDEV number of the virtual device that is created in the primary storage 2. World Wide Name (WWN) 252 and LUN 253 show the WWN and LUN of the logical device of the external storage 4 which is mapped to the virtual device specified with LDEV number 251.

Also, to enable a virtual device to be accessed from host 1, port number and LUN must be assigned with the virtual device and the combination of the LDEV number of the virtual device, port number and LUN are registered to the path configuration table 600.

The above described RAID, Logical Device, Path and Disk Status Configuration Tables 500, 550, 600, and 650, respectively shown in FIGS. 4-9 are stored in the configuration information 215 and 415 of the primary storage 2 and the external storage 4, respectively. However, the Port Status and Virtual Device Configuration Tables 400 and 250, respectively are not stored in the configuration information 415 of the external storage 4. Also a copy of the configuration information 215 and 415 is stored in the configuration information 35 of the management host 3.

E. Process Flow

FIGS. 10, 11 and 13-15 each illustrate various processes performed as a result of execution of the functions of the storage manager 36, the virtualization process 212 and the migration process 213. The flow chart illustrated in each of FIGS. 10, 11 and 13-15 can, for example, be implemented by hardware and/or software. If implemented by software each of the steps of the flow chart can, for example, correspond to computer program code or instructions executed by a processor.

When the various processes are performed as will be described below, the information system is caused to operate in a reliable manner even though each of the primary and external storages 2 and 4 are of a different kind of storage system (e.g. manufactured by the different vendors) from the others having different rates of reliabilities. Thus, the present invention is intended to account for such situations by having the primary storage 2 treat logical devices 421 in the external storage 4 as if they were logical devices in the primary storage 2. According to the present invention when a disk 47 that forms at least a part of a logical device 421 in the external storages 4 fails, the management host 3 detects the failure and judges whether the logical device 421 is used by the primary storage 2 to form a virtual device. If the logical device 421 is used by the primary storage 2 to form a virtual device, then the management host 3 issues a data migration request to the primary storage 2. In response to the data migration request, the primary storage 2 migrates data from the failed logical device of the external storage 4 to a logical device 271 in the primary storage 2 to avoid data loss. For example, if a disk 47 that fails is part of a RAID-1, 3, 4, or 5 group, then the RAID group loses redundancy. In this state, if another disk 47 fails, data will be lost. To avoid this situation, the primary storage 2 migrates data from any logical devices 421 at risk of data loss due to the failure of the disk 47.

The following description of the flowcharts of FIGS. 10, 11 and 13-15 is of the processes which implement the above described operation of the present invention.

Figure 10:
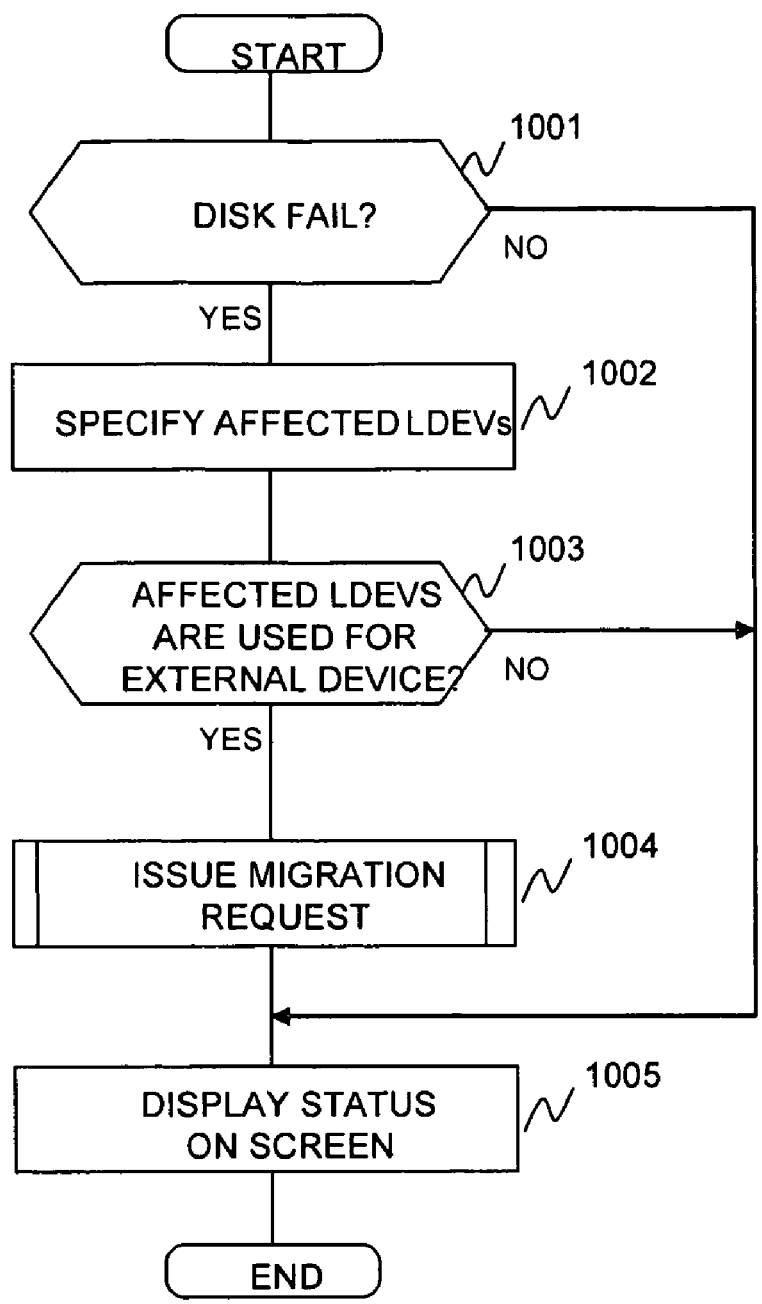
FIG. 10 is a flowchart of the steps performed by the storage manager 35 upon detection of a failure according to an embodiment of the present invention.

As per FIG. 10 the flow of the process illustrated therein shows the flow of process of the storage manager 36 when a failure of a hardware component in the external storage 4 occurs. When a failure occurs in the external storage 4, a notification is sent to the storage manager 36. In another embodiment, however storage manager 36 periodically inquires of the external storage 4 to check whether a failure has occurred in the external storage 4. Some of the failures in the external storage 4, upon occurrence, may decrease the reliability of data in the logical device. For example, if one of the disks 47 that fails is part of the RAID-1, 3, 4, or 5 groups, then the RAID group loses redundancy. In this state, if another disk 47 fails, data will be lost. To avoid this situation, the primary storage 2 migrates data in the logical device having the disk that failed to another logical device.

As illustrated in FIG. 10, the storage manager 36 judges whether a disk or any other such hardware component has failed and whether the hardware component failure decreases the reliability of the logical device in the external storage 4, namely loss of redundancy (Step 1001). If a failure has been detected and a loss of redundancy occurs, then the process proceeds to step 1002. However, if the failure does not affect the reliability of the logical devices, then the process goes to step 1005. A failure of a hardware component that does not affect the reliability of the logical devices could, for example, be a situation where an unused port 44 of the external storage 4 fails. A failure in the unused port 44 does not affect the reliability of the logical devices.

After step 1001 the process selects or specifies the LDEVs that are affected by the failure (Step 1002). After step 1002 the process judges whether the selected LDEVs are mapped to external devices, specifically whether virtual devices corresponding to the external devices exist in the primary storage 2 (Step 1003). If virtual devices corresponding to the external devices exist, then the process proceeds to step 1004. If virtual devices corresponding to the external devices do not exist, then the process proceeds to step 1005. Based on the Virtual Device Configuration Table 250, the process specifies the virtual devices to be migrated (Step 1004). Also, the process issues a data migration request to the primary storage 2 by specifying the virtual devices to be migrated. Details of the steps performed to implement step 1004 will be described below. After the data migration request has been issued, status information is displayed on a display screen of, for example, the management host 3 (Step 1005).

Thus, for example, the storage manager 36 displays the state of the external storage 4 on a Graphical User Interface (GUI) of the display screen. The storage manager 36 also displays information regarding the hardware component that failed, and if data migration occurs at step 1004, the storage manager 36 displays that the migration is in progress. Upon sending the data migration request as per step 1004, the process proceeds to step 1005 immediately without waiting for completion of data migration.

Figure 11:
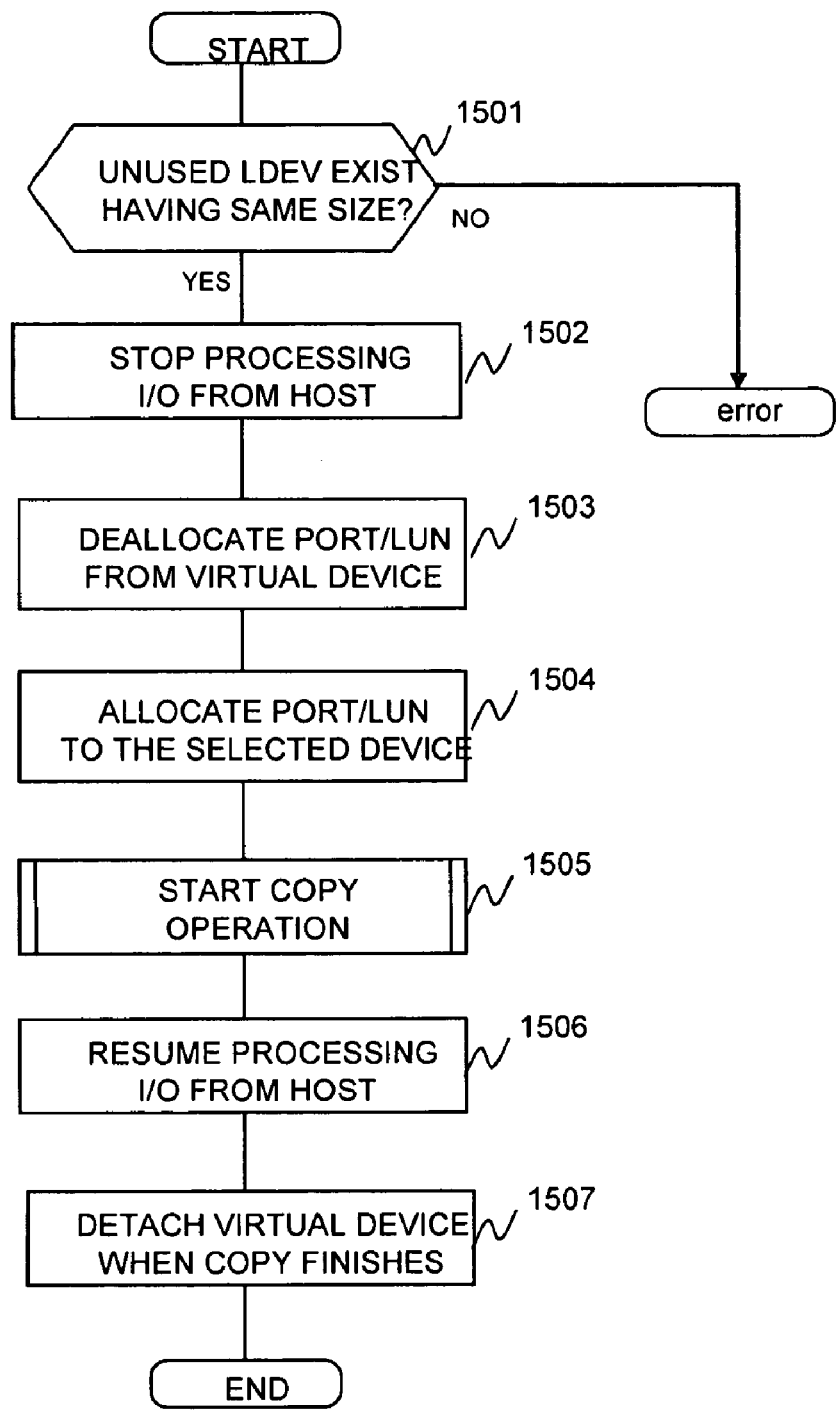
FIG. 11 is a flowchart detailing the steps performed to implement step 1004 when a migration request has been issued according to an embodiment of the present invention.

FIG. 11 shows the details of steps to implement the process flow of data migration that is executed when a data migration request is issued at step 1004. The process checks whether logical devices that are not in use, as indicated by not being contained in the Path Configuration Table 600, exists and whether a virtual device having a size the same as the external device to be migrated in the external storage 4 exists in the primary storage 2 (Step 1501). If such a LDEV exists, the process proceeds to step 1502. If not, the process returns an error message to the storage manager 36 and terminates the process. The process stops receiving/processing I/O requests from host 1 (Step 1502). The process de-allocates port number 601 and 602 in the Path Configuration Table 600 from the virtual device to be migrated; specifically the logical device information is deleted from the Path Configuration Table 600 (Step 1503). The process selects one of the unused LDEVs from the set of LDEVs that were found at step 1501, and assigns the port number and LUN that are de-allocated from the virtual device to the selected LDEV (Step 1504). The process instructs the migration process 213 to start data copy operation from the virtual device to the selected LDEV. After the operation starts, the process immediately proceeds to step 1506 without waiting for the completion of the copy operation (Step 1505). The primary storage 2 resumes receiving/processing I/O requests from host 1 (Step 1506). From the perspective of host 1, due to the steps 1503, 1504 and 1505, the selected LDEV can be seen as if the same data is stored in it as the failed LDEV. The virtualization process 212 waits for completion of the copy operation and when the copy finishes, the virtualization process 212 deletes the virtual device in the primary storage 2. Specifically, the process deletes the corresponding entry from the virtual device configuration table 250 (Step 1507).

In the present embodiment, the process is executed in the primary storage 2 using the management process 214 and the migration process 213. However, in another embodiment, the process may be executed in the storage manager 36 in the management host 3.

Figures 12, 13:
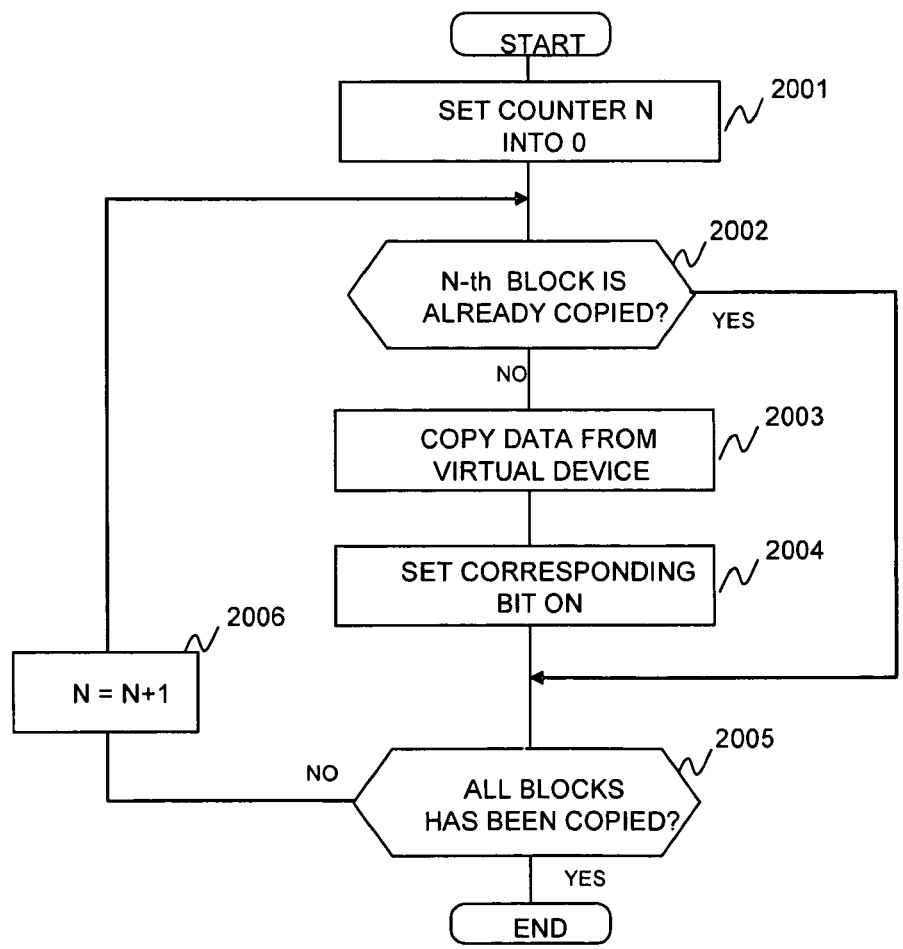
FIG. 12 is a diagram for explaining a Bitmap 700 generated upon execution of a migration process 213 according to an embodiment of the present invention.
FIG. 13 is a flowchart detailing the steps performed to execute a data copy operation in the migration process 213 according to an embodiment of the present invention.

FIG. 12 shows an example of a Bitmap Table 700. The Bitmap Table 700 provides an indication whether data corresponding to a particular logical block address (LBA) has been copied to a particular logical device. Thus, a bit 702 is provided in the Bitmap Table 700 to indicate whether data of a corresponding LBA has been copied to a destination logical device. Accordingly, if the bit 702 corresponding to a LBA is '1', then the data in the LBA has been copied to the destination logical device and if the bit corresponding to the LBA is '0', then the data in the LBA has not been copied to the destination logical device.

FIG. 13 shows the details of the process flow of the data copy operation that is executed in the migration process 213 when the start data copy operation of step 1505 as per FIG. 11 has been invoked. When the migration process 213 executes the data copy operation of step 1505, the Bitmap Table 700 is prepared and is assigned to a target logical device. The process sets the count N of a counter to a particular number. (Step 2001). At first, the count N of the counter is set to 0. The process copies data in each logical block. The process searches the Bitmap Table 700 to determine whether the N-th logical block has already been copied (Step 2002). If the logical block has been copied, then the process proceeds to step 2005. If the logical block has not been copied, then the process proceeds to step 2003. The process copies the logical block in the virtual device, whose logical block address is specified by the number N of the counter, to the corresponding logical block address (typically the same LBA) in the destination logical device (Step 2003). The process sets the bit 702 of the Bitmap Table 700 corresponding to the LBA to '1'. The process checks the Bitmap Table 700 to determine whether all logical blocks have been copied to the destination logical device (Step 2005). If the copy operation has finished, then the process ends. If the copy operation has not been finished, then the process proceeds to step 2006. In order to copy the next logical block, 1 is added to the count N of the counter (Step 2006). Then the process proceeds back to step 2002.

During the data copy/migration operation, the host 1 is enabled to access the data in the virtual volume. To accomplish the above, the migration process 213 provides a mechanism to process read/write I/Os, while the copy process is running. There are a couple of ways to enable processing of read/write I/Os during the copy process. Described below is an example of such ways.

Figure 14:
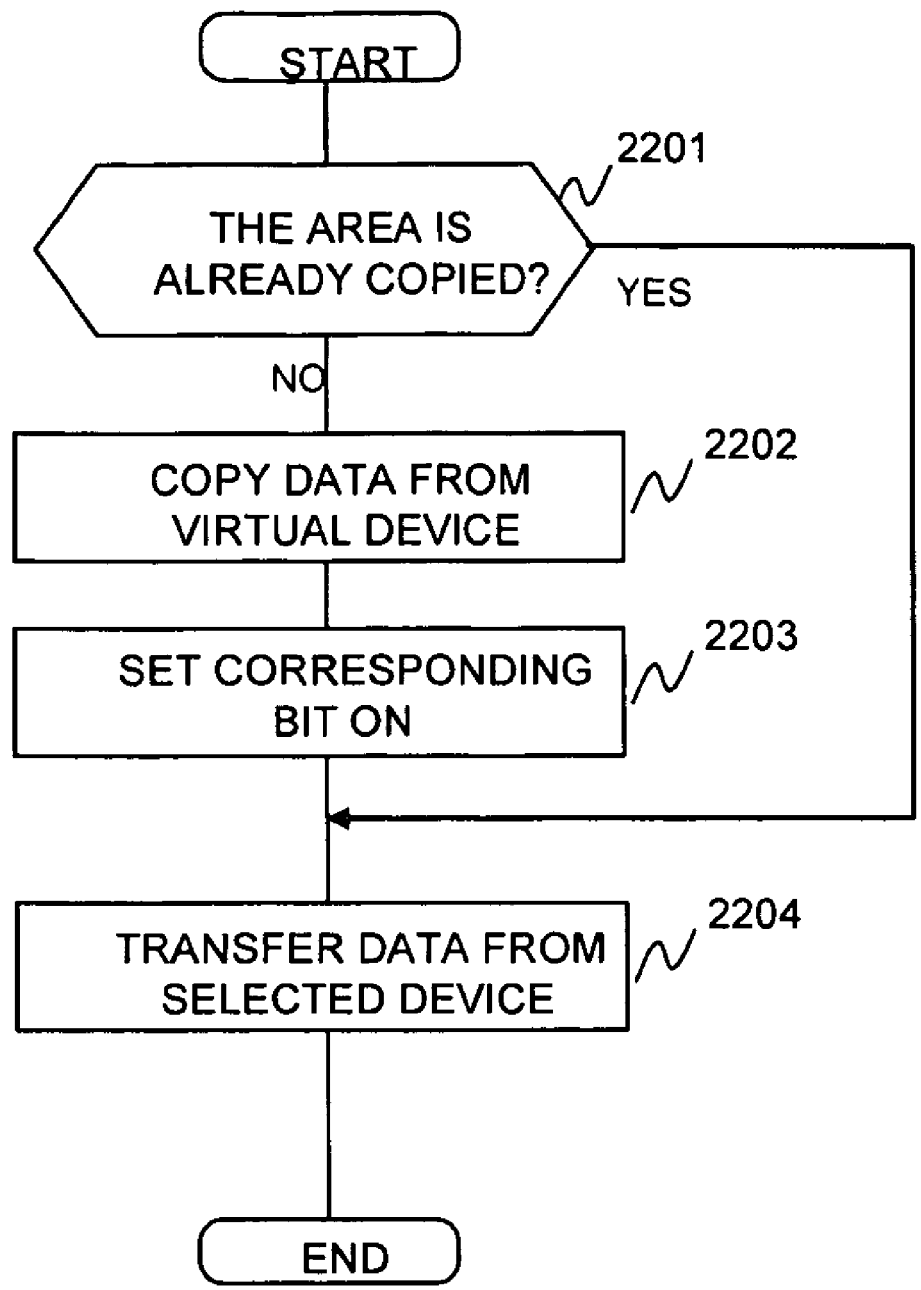
FIG. 14 is a flowchart detailing the steps performed to implement the migration process 213 when a read request to a destination logical device arrives according to an embodiment of the present invention.
Figure 15:
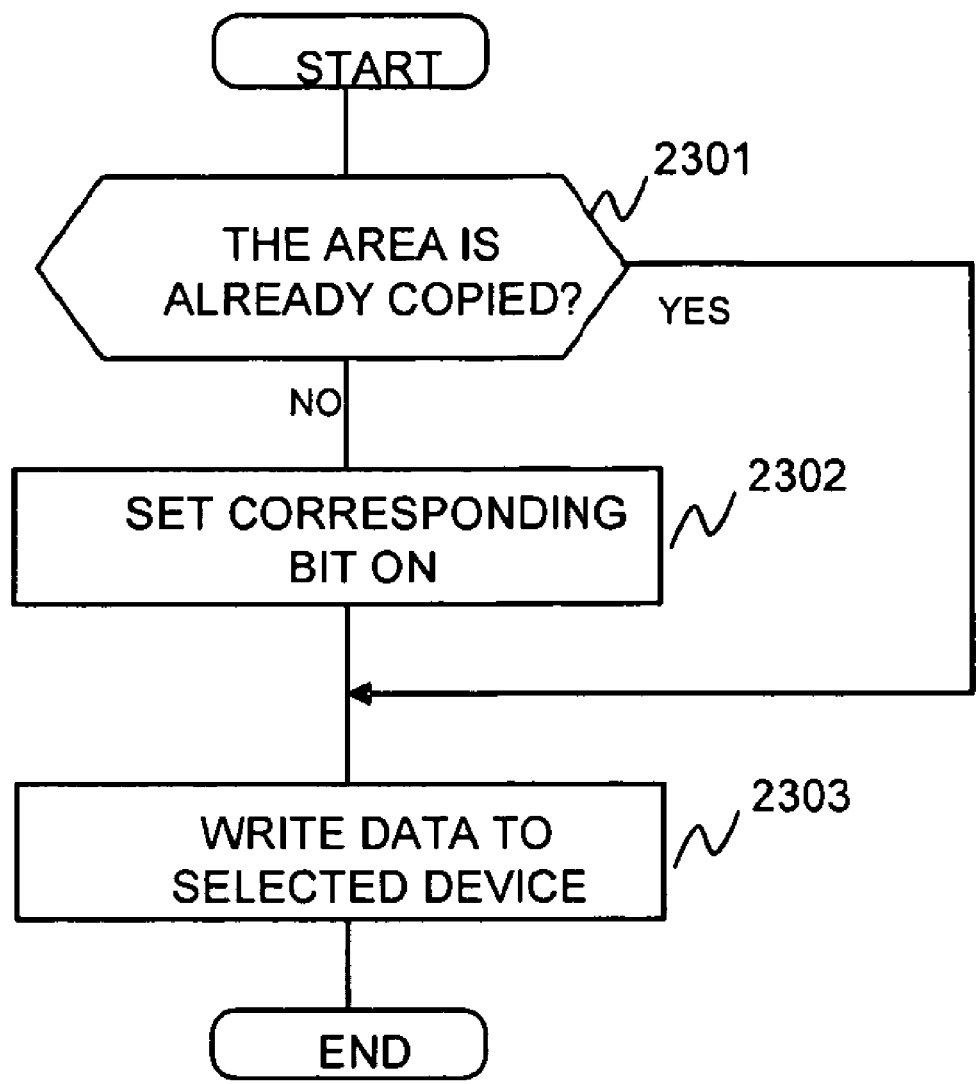
FIG. 15 is a flowchart detailing the steps performed to implement the migration process 213 when a write request to a destination logical device arrives according to an embodiment of the present invention.

FIG. 14 shows the process flow of the migration process 213 when a read request to the destination logical device arrives, and FIG. 15 shows the process flow of the migration process 213 when a write request to the destination logical device arrives.

As per FIG. 14, when the read request comes to the destination logical device, at step 2201 the migration process 213 checks the Bitmap Table 700 to determine whether the logical block designated by the LBA included in the read request has already been copied from the virtual device to the destination logical device. If the logical block has been copied, then the process proceeds to step 2204. If the logical block has not been copied, then the process proceeds to step 2202.

If the logical block has not been copied, then the process copies the data of the designated logical block address in the virtual device to the corresponding LBA in the destination logical device (Step 2202). The process then sets the bit 702 of the corresponding LBA in the Bitmap Table 700 to '1' (Step 2203). The data of the designated logical block address now being in the destination logical device, allows for the transfer of read data from the destination logical device to the host 1 (Step 2204).

As per FIG. 15, when a write request comes to the destination logical device, at step 2301 the migration process 213 checks the Bitmap Table 700 to determine whether the logical block designated by the LBA in the write request has already been copied from the virtual device to the destination logical device. If the logical block has been copied, then the process proceeds to step 2303. If the logical block has not been copied, then the process proceeds to step 2302.

If the logical block has not been copied, then the process sets the bit 702 of the corresponding LBA in the Bitmap Table 700 to '1' (Step 2302). The process then writes data from host 1 to the destination logical device (Step 2303).

The above description mainly refers to the case where one external storage 4 exists in the information system and the data in the external storage 4 is migrated to the primary storage 2 if a hardware component error occurs in the external storage 4.

However, in another embodiment, there is a case where a plurality of external storages exist. FIG. 16 illustrates an example of a configuration of an information system where two external storages 4 and 4' exist. Access to the respective external storages 4 and 4' are routed by a switch 8 which could be a Fibre Channel (FC) switch. In the information system as illustrated in FIG. 16, when a hardware component in the external storage 4 fails and the redundancy of the logical device 421 of the external storage 4 is lost, data in the logical device 421 of the external storage 4 can be migrated to the logical device 421' of the external storage 4', by migrating from a virtual device 272-1 corresponding to logical device 421 to a virtual device 272-2 corresponding to logical device 421'. In such an information system it is also possible for the data in the logical device 421 to be migrated to an internal device in the primary storage 2.

2. $2^{nd}$ Embodiment

A. System Configuration

Figure 17:
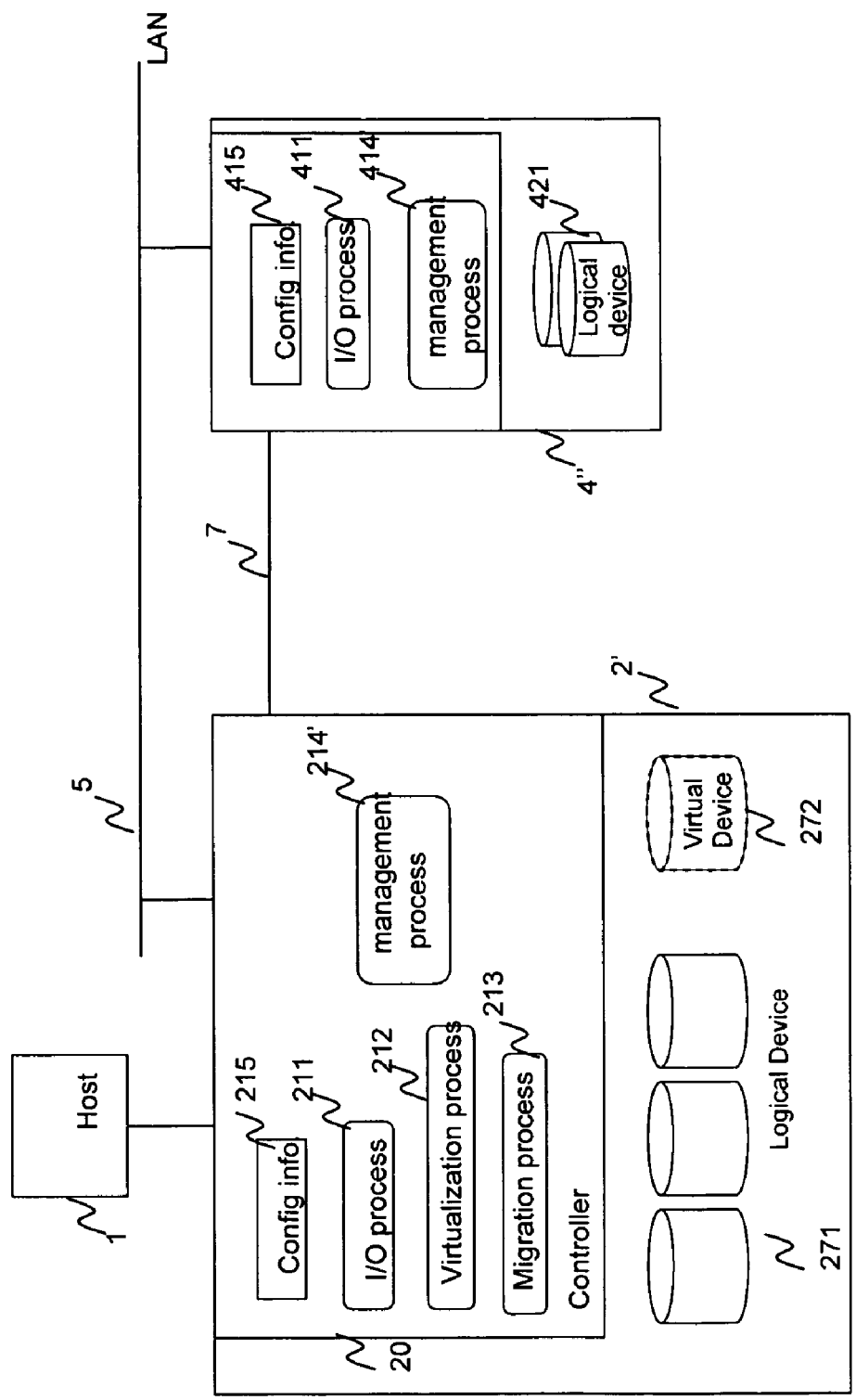
FIG. 17 illustrates an example of logical components that form an information system similar to that shown in of FIG. 1 with the exception of the management host 3 according to yet another embodiment of the present invention.

FIG. 17 shows a functional diagram of an information system of a $2^{nd}$ embodiment of the present invention. The configuration of an information system to which the $2^{nd}$ embodiment is applied is almost the same as the information system of the $1^{st}$ embodiment as illustrated in FIG. 1 with the exception that the management host 3 does not exist.

FIG. 17 illustrates the functions of the $2^{nd}$ embodiment in the form of processes and a manager that reside in the primary storage 2' and the external storage 4". The processes include I/O process 211, virtualization process 212, migration process 213 and management process 214' included in the controller 20 of the primary storage 2', and I/O process 411 and management process 414' included in the controller 40 of the external storage 4". The processes as illustrated in FIG. 17 each can, for example, be implemented by hardware and/or computer programs. If implemented by computer programs each of the processes can, for example, correspond to computer program code or instructions executed by a processor.

According to the $2^{nd}$ embodiment, when a hardware component failure occurs in the external storage 4", a report of such failure is transmitted to the primary storage 2' directly from the external storage 4" via LAN 5. In another implementation, the primary storage 2' periodically inquires of the external storage 4" via a data transmission line 7 to determine whether any hardware component failure has occurred.

The process flow for the $2^{nd}$ embodiment that is executed when a hardware component failure has occurred in the external storage 4" is almost the same as the process flow as illustrated in FIGS. 10-15 for the $1^{st}$ embodiment. The difference between the process flows is that the process flow for the $2^{nd}$ embodiment, particularly the process illustrated in FIG. 17, is executed in the management process 214' in the primary storage 2' rather than the storage manager 36 as per the process illustrated in FIG. 10.

B. How to Detect Hardware Component Error

If the external storage 4" does not have means for informing the primary storage 2' that a hardware component failure has occurred, then the primary storage 2' can not readily know when a hardware component failure has occurred. Thus, the primary storage 2' must make assumptions as to whether a hardware component failure has occurred using other means.

For example, when one of the disks that form a logical device in the external storage 4" has failed, the read performance (response time or throughput) of the external storage 4" tends to decrease since the external storage 4" needs to reconstruct data using parity information to retrieve data. Being aware of this phenomenon, the primary storage 2' periodically checks the I/O performance of the external storage 4" by periodically accessing the logical device. If the primary storage 2' determines that a degradation of performance of the logical device has occurred, then the primary storage 2' can assume that one of the disks that form the logical device in the external storage 4" has failed. It is difficult for this method to detect other hardware component failures such as power source or cache memory. Also, even if performance degradation has been detected, disk failure may not necessarily have occurred. However, this method is still highly useful since it is one of the good ways to prevent data loss due to disk failure.

Figure 18:
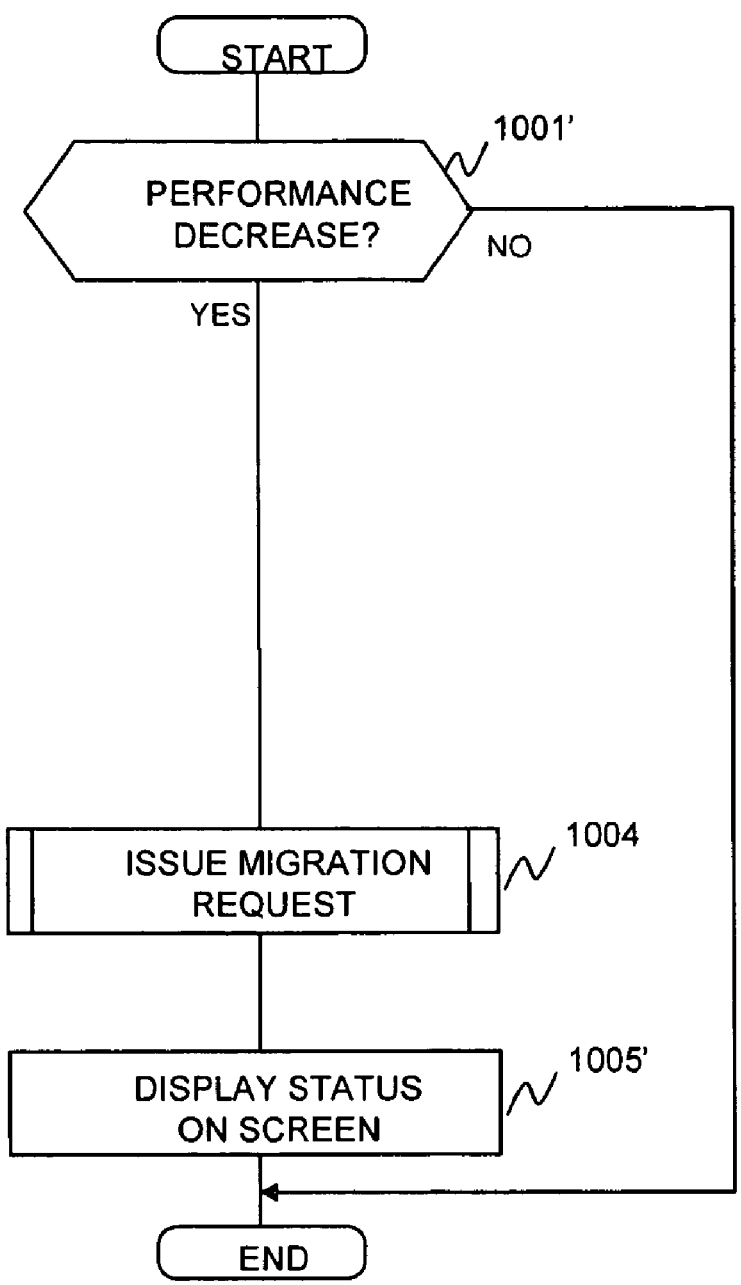
FIG. 18 is a flowchart detailing the steps performed to implement a management process 214' according to an embodiment of the present invention.

FIG. 18 shows the process flow of the management process 214' when it is assumed that a disk drive failure in the external storage 4" has occurred. This process is similar to the process illustrated in FIG. 10 of the $1^{st}$ embodiment. This process is periodically executed, for example, once an hour, once a day, etc.

As per FIG. 18, if the management process 214' detects performance degradation of the virtual devices in the primary storage 2', then the process proceeds to step 1004'. If the management process does not detect performance degradation, then the process ends normally (Step 1001'). If the management process 214' detects degradation in the performance of the virtual devices, then the management process 214' performs the same step of issuing a data migration request as in step 1004 of the $1^{st}$ embodiment (Step 1004). If the primary storage 2' has a management terminal, such as a laptop, PC or information panel, the management process 214' displays the state of the virtual volume on the display screen thereof. The state of the virtual volume being displayed indicates that the data migration operation is in progress.

$3^{rd}$ Embodiment

A. System Configuration

Figure 19:
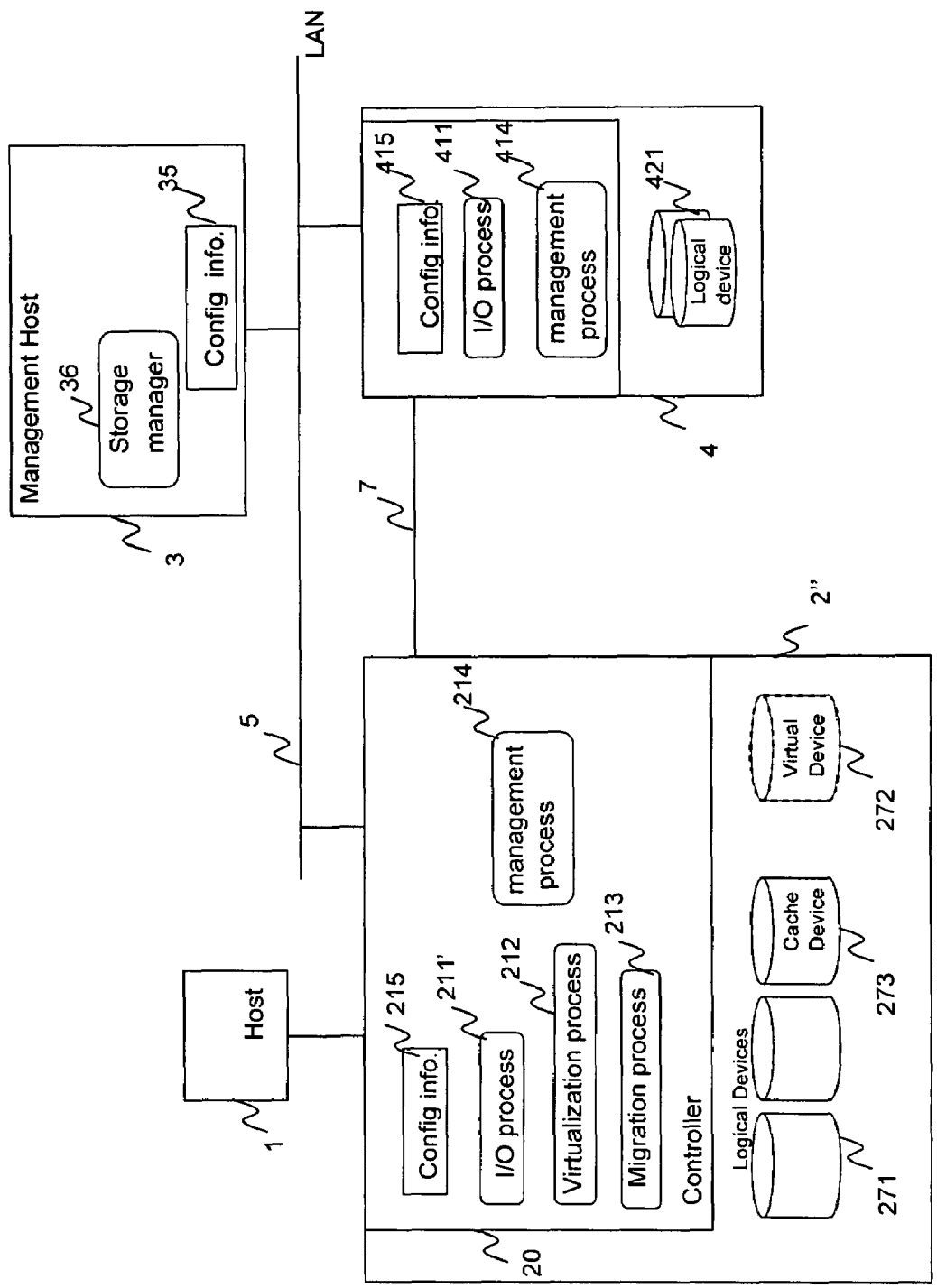
FIG. 19 illustrates an example of logical components that form an information system similar to that shown in of FIG. 1 with the exception that the primary storage system 2" maintains cache devices according to still yet another embodiment of the present invention.

FIG. 19 shows a functional diagram of an information system of a $3^{rd}$ embodiment of the present invention. The configuration of information system to which the $3^{rd}$ embodiment is applied is almost the same as the information system of the $1^{st}$ and $2^{nd}$ embodiments as illustrated in FIG. 1 with the exception that the primary storage 2" maintains cache devices and that write/update of data to the virtual volume is not transferred to the external device. Instead, the write/update of data is stored in the cache devices.

FIG. 19 illustrates the functions of the $3^{rd}$ embodiment in the form of processes and a manager that reside in the primary storage 2" and the external storage 4 and the management host 3. The processes include I/O process 211', virtualization process 212, migration process 213 and management process 214 included in the controller 20 of the primary storage 2", and I/O process 411 and management process 414 included in the controller 40 of the external storage 4. The processes as illustrated in FIG. 19 each can, for example, be implemented by hardware and/or computer programs. If implemented by computer programs each of the processes can, for example, correspond to computer program code or instructions executed by a processor.

As illustrated in FIG. 19 and as discussed above, the difference between the $1^{st}$ and $3^{rd}$ embodiments is that a cache device 273 exists in the primary storage 2" and that the I/O process 211' handles the cache device 273. The cache device 273 is a kind of logical device and a user defines one or more of the cache devices 273 from the logical devices 271 defined in the primary storage 2".

FIG. 20 shows the Logical Device Configuration Table 550' that is used in the $3^{rd}$ embodiment. It is similar to the Logical Device Configuration Table 550 as illustrated in FIG. 5 and used in the $1^{st}$ or $2^{nd}$ embodiments of the present invention. The differences between the Logical Device Configuration Table 550' and the Logical Device Configuration Table 550 are a column 555 is added to the Logical Device Configuration Table 550'. Cache 555 indicates whether the corresponding logical device is defined as a cache device 273. Thus, when the value of the cache 555 is '1', the corresponding logical device is defined as the cache device 273. A logical device 271 can be defined as a cache device 273 by users from the storage manager 36.

In the $3^{rd}$ embodiment, when a virtual device 272 is defined, a Cache Bitmap Table 700' as illustrated in FIG. 21 is generated with respect to the virtual device 272. The Cache Bitmap Table 700' is similar to the Bitmap Table 700 as illustrated in FIG. 12 in the $1^{st}$ or $2^{nd}$ embodiment of the present invention with the exception of columns 703 and 704. Also, the Cache Bitmap Table 700' is always used when read or write I/O requests comes to the virtual device 272.

The Cache Bitmap Table 700' provides an indication whether data corresponding to a particular logical block address (LBA) of the cache device 274 has been allocated. Thus, with respect to BIT 702, if the value is 1, it means the data block specified in the LBA 701 has been written or updated. Therefore, in this case, the data block of the cache device 274 is allocated. With respect to LDEV 703 and LBA 704, when a data block of the cache device 274 is allocated, the corresponding logical device number of the cache device 274 and the LBA is set. If the data block of the cache device 274 is not allocated, then the value '−1' is set.

B. Process Flow of Read/Write Operation

Figure 22:
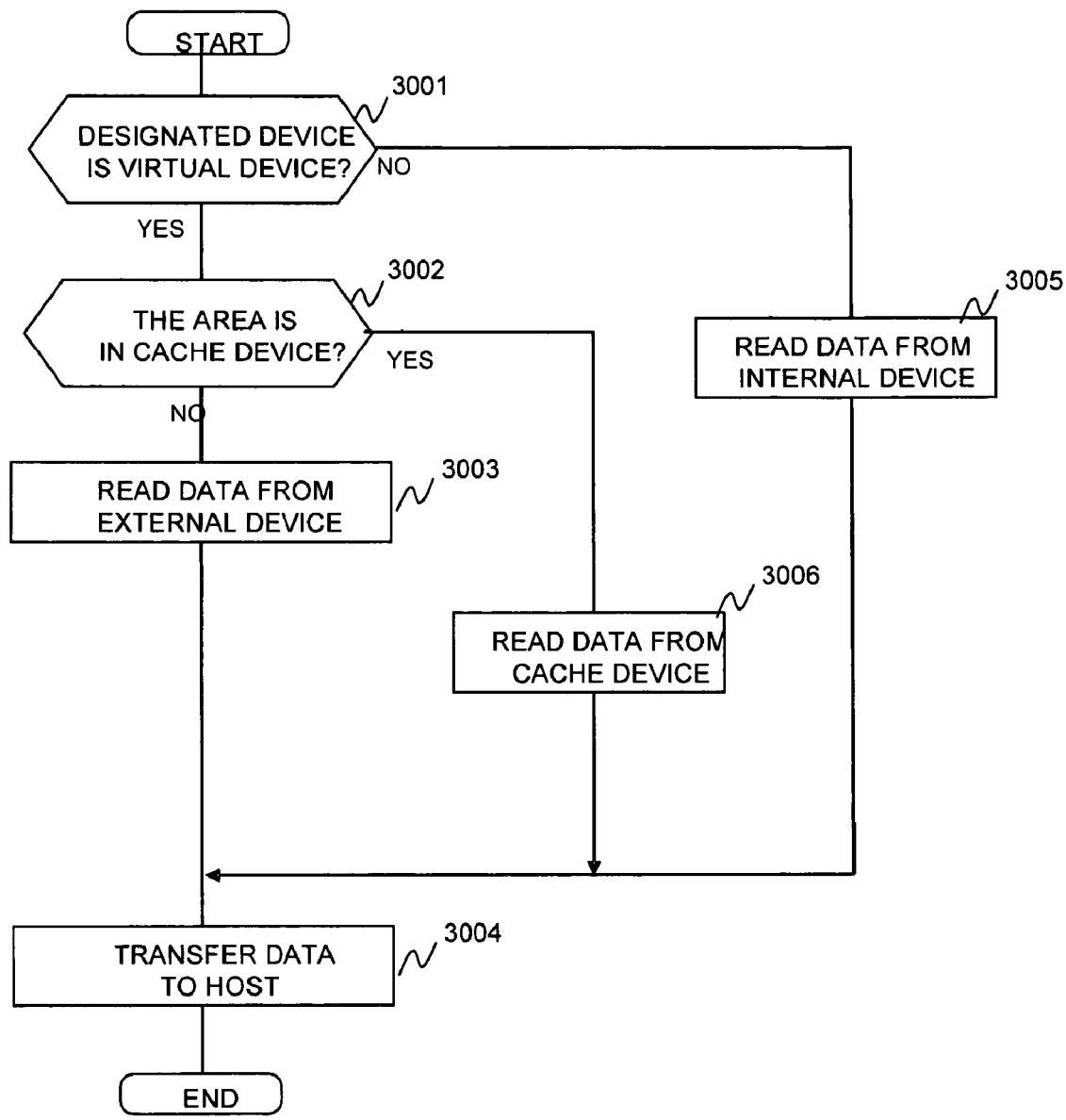
FIG. 22 is a flowchart detailing the steps performed to implement an I/O process 211' when a read request is received by the primary storage 2" according to the still yet another embodiment of the present invention.

FIG. 22 shows the process flow of the I/O process 211' when a read request comes to the primary storage 2" from host 1. The process judges whether the read request is targeted to the virtual device 272 (Step 3001). The judging by the process as to whether the read request is targeted to the virtual device is performed by referring to the Path Configuration Table 600 and the Virtual Device Configuration Table 250. If the read request is not targeted to the virtual device, then the process reads the data from the internal device of the primary storage 2" (Step 3005). However, if the read request is targeted to the virtual device, then the process refers to the Cache Bitmap Table 700' to check if cache device 274 is allocated to the block address of the virtual device designated by the read request (Step 3002). If the cache 274 is allocated to the block address of the virtual device, then the process reads data from the cache device 274 (Step 3006). The address LBA is determined by referring to the LDEV 703 and LBA 704 in the Cache Bitmap Table 700'. If data block of cache device 274 is not allocated, then the process reads the data from the external device of the external storage 4 (Step 3003). Thereafter the data is transferred to the host 1 (Step 3004).

Figure 23:
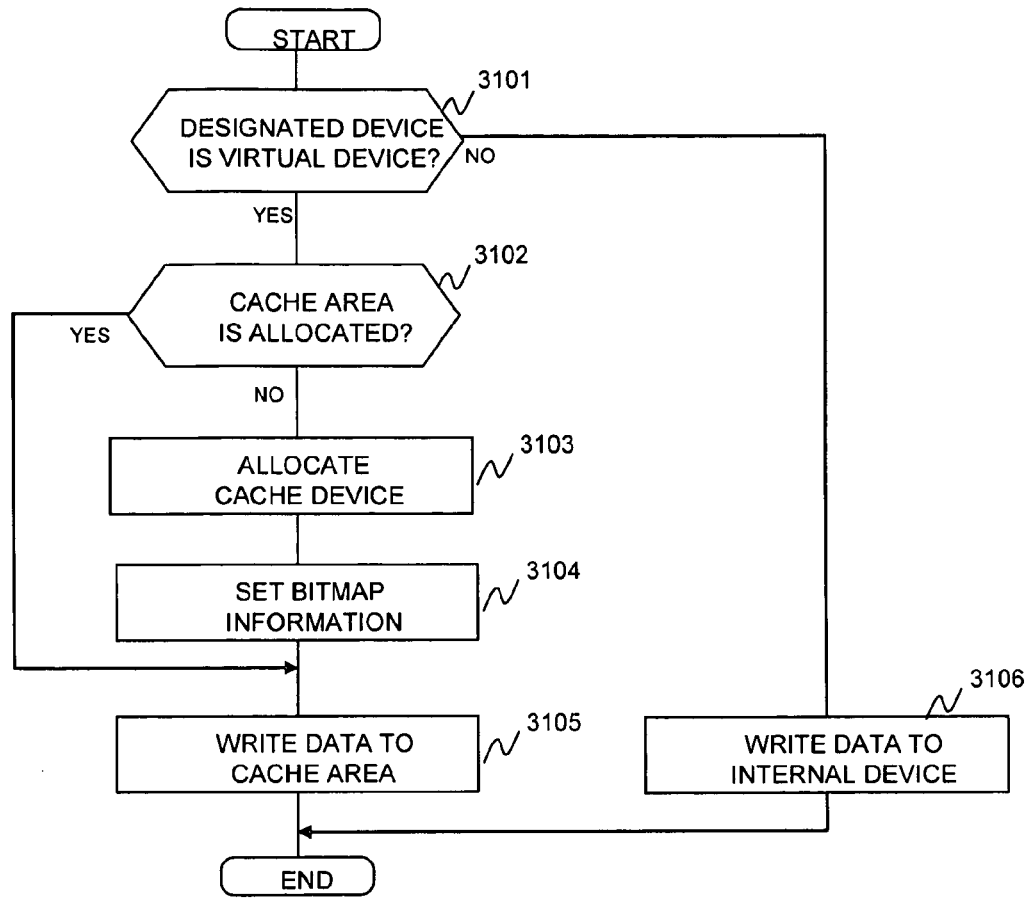
FIG. 23 is a flowchart detailing the steps performed to implement an I/O process 211' when a write request is received by the primary storage 2" according to the still yet another embodiment of the present invention.

FIG. 23 shows the process flow of the I/O process 211' when a write request comes to the primary storage 2" from the host 1. The process judges whether the write request is targeted to the virtual device 272 (Step 3101). If the write request is not targeted to the virtual device, then the process writes the data to the internal device of the primary storage 2" (Step 3106). However, if the write request is targeted to the virtual device, then the process refers to the Cache Bitmap Table 700' to check if cache device 274 is allocated to the block address of the virtual device designated by the write request (Step 3102). If the cache device 274 is allocated to the block address of the virtual device, then the process writes data to the designated LBA of the cache device 274 (Step 3105). The LBA is determined by referring to the LDEV 703 and LBA 704 in the Cache Bitmap Table 700' data to the cache device 274. If data block of cache device 274 is not allocated, then the process allocates the data block in the cache device 274 to the corresponding LBA designated in the write request. LDEV 703 and LBA 704 information are registered to the Cache Bitmap Table 700' (Step 3103). Also, BIT 702 of the corresponding LBA 701 of the Cache Bitmap Table 700' is set to 1 (Step 3104). Thereafter the process writes data to the designated LBA of cache device (Step 3105).

In the 3$^{rd}$ embodiment, the migration process that is described in the 1$^{st}$ embodiment may be executed when a hardware component failure occurs. In this case, when the data is copied from the virtual device to the internal device, and when reading data from the virtual device and writing data to the destination internal device, the read process that is described in FIG. 22 is used when the data is read from the virtual device.

Therefore, according to the present invention as describe above, an information system is provided having a primary storage system, a host, at least one external storage system, and a management host. Alternatively the present invention could provide an information system that does not include the management host.

Each of the primary and external storage systems may be a different kind of storage system from the other storage system. As per the present invention the primary storage system treats logical devices in the external storage system as if they were logical devices in the primary storage system. When a disk that forms at least a part of a logical device in the external storage systems fails, the management host detects the failure and judges whether the logical device is used by the primary storage system to form a virtual device. Alternatively the functions performed by the management host could be performed by the primary storage system if the management host is not included in the information system.

If the logical device is used by the primary storage system to form a virtual device, then the management host issues a migration request to the primary storage system. In response to the migration request, the primary storage system migrates data from the failed logical device of the external storage system to a logical device in the primary storage system to avoid data loss.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. An information system comprising:
   a host;
   a primary storage system connected to said host, said primary storage system including a primary disk controller and a plurality of first disks for storing data;
   at least one external storage system, each having an external disk controller and a plurality of second disks for storing data, said second disks being configured in a redundant configuration to provide protection against data loss in the event of failure of one or more of the second disks, wherein said primary storage system uses virtual devices to treat logical devices in said at least one external storage system as if they are logical devices in said primary storage system;
   a first logical device formed in said at least one external storage system from the plurality of said second disks, said first logical device being used by said primary storage system to create a first virtual device in the primary storage system; and
   a network which interconnects said primary storage system, and said at least one external storage system to each other,
   wherein the primary storage system periodically checks I/O performance of the at least one external storage system by periodically accessing the first logical device that is used by said primary storage system for the first virtual device,
   wherein the primary storage system assumes that one of said plurality of second disks that forms a part of the first logical device in said at least one external storage system has failed when the I/O performance has decreased by a predetermined amount,
   wherein, when said primary storage system assumes that one of the plurality of second disks that forms a part of the first logical device has failed, said primary storage system automatically migrates data from the first logical device of said at least one external storage system to a second logical device in said primary storage system to avoid data loss by locating an unused second logical device, stopping processing of any input/output (I/O) operations from the host, reallocating a port and logical unit number to the second logical device, copying data from the virtual device to the second logical device, and resuming processing of I/O operations from the host without waiting for the copying of data to be completed,
   wherein said primary storage system is configured to periodically access the first logical device in the external storage system to determine whether a throughput in response to an access request has decreased, and
   wherein said throughput of the external storage system is measured by read performance in response to the access request that decreases by said predetermined amount based on a need of the external storage system to reconstruct read data using parity information to retrieve the read data.

2. An information system according to claim 1,
   wherein said primary storage system includes a third logical device defined on said primary storage system as a cache device, wherein, prior to the failure of said second disk, when said primary storage system receives write data targeting said virtual device, said primary storage system writes the write data to said third logical device instead of to said first logical device.

3. An information system according to claim 1, wherein said primary disk controller comprises:
a primary input/output (I/O) function that processes I/O requests from said host and creates logical devices from said disks included in said primary storage system;
a virtualization function that creates the virtual devices using the logical devices in said at least one external storage system,
a migration function that copies data in a logical device or virtual device in said primary storage system to another logical device or virtual device in said primary storage system while said primary storage system receives I/O requests from said host, and
a primary management function that communicates with a external management function in said external storage system and operates said primary storage system in accordance with information from said external management function.

4. An information system according to claim 1, wherein said external storage system further includes a spare second disk that replaces said failed one of said second disks following failure.

5. An information system according to claim 1, wherein to manage logical devices and virtual devices, said primary and external disk controllers manage configuration information of said primary and external storage systems.

6. An information system according to claim 5,
wherein said configuration information includes a Redundant Arrays of Inexpensive Disks (RAID) configuration table which is used for managing disks included in said primary and external storage systems for providing said redundant configuration,
wherein said RAID configuration table includes a plurality of entries, each having information of each RAID group including: a RAID group number of each group, disk numbers that identify disks that correspond to each group, a RAID level for each group, and stripe size information of a size of a stripe corresponding to each group, and
wherein a stripe is a number of consecutively addressed blocks in a disk within which data is stored.

7. An information system according to claim 5,
wherein said configuration information includes a Path Configuration Table which defines a path to be used to access a particular logical device, and
wherein said Path Configuration Table includes a plurality of entries including port IDs identifying ports through which particular logical devices are to be accessed, Logical Unit Number (LUN) which are renumbered IDs of the particular logical devices and logical device (LDEV) which identifies the particular logical devices.

8. An information system according to claim 5,
wherein said configuration information includes a Disk Status Table which provides information regarding the status of each of the disks of said primary or external storage system including information as to whether a disk has failed and been replaced by a corresponding spare disk, and
wherein said Disk Status Table includes a plurality of entries each having disk numbers that identify particular disks, information indicating the status of the disks, and information regarding spare disks corresponding to the disks.

9. An information system according to claim 5,
wherein said configuration information includes a Port Configuration Table which defines configuration of ports of the primary storage system, and
wherein said Port Configuration Table includes a plurality of entries each having port IDs identifying ports to which a particular configuration is to be applied and information regarding the state of current configuration of the ports.

10. An information system according to claim 5,
wherein said configuration information includes a Virtual Device Configuration Table which maps virtual devices of the primary storage system to logical devices of the external storage system, and
wherein said Virtual Device Configuration Table includes a plurality of entries each having logical device numbers of the virtual devices and information of the logical devices corresponding to the virtual devices.

11. An information system according to claim 1, wherein when said information system includes at least two external storage systems a switch is provided to route accesses to respective external storage systems.

12. An information system according to claim 1,
wherein said primary storage system includes a third logical device defined on said primary storage system as a cache device,
wherein, prior to the failure of said second disk, when said primary storage system receives write data targeting a logical block address on said virtual device, said primary storage system writes the write data to said third logical device instead of to said first logical device,
wherein when said primary storage system receives a read request targeting said virtual device, said primary storage system determines from a bitmap table maintained in the primary storage system whether to read requested data from the third logical device or from the first logical device.

13. An information system according to claim 1, wherein the primary storage system is configured to periodically access the first logical device in the external storage system according to a scheduled time period.

14. An information system comprising:
a primary storage system having a primary disk controller a plurality of primary disks for storing data; and
an external storage system connected for communication with said primary storage system, said external storage system including an external disk controller and a plurality of external disks for storing data, said external disks being configured in a RAID configuration to provide redundant protection against data loss in the event of failure of one or more of the external disks;
wherein said primary storage system maps a first virtual device on the primary storage system to a first logical device in said external storage system, said first logical device being created from said plurality of external disks,
wherein write data targeting said first virtual device as if it were a logical device in said primary storage system, is transferred by the primary storage system to the external storage system, said external storage system storing the write data in said first logical device,
wherein the primary storage system periodically checks I/O performance of the external storage system by periodically accessing the first logical device that is used by said primary storage system to map the first virtual device, wherein the primary storage system assumes that one of said plurality of external disks that forms a part of the first logical device in said external storage system has failed when the I/O performance has decreased by a predetermined amount, wherein, when said primary storage system assumes that one of the plurality of second disks that forms a part of the first logical device has failed, said primary storage system automatically migrates data from the first logical device of said external storage system to a second logical device located on said primary storage system, wherein, during said migration, said primary storage system is able to continue to receive input/output (I/O) operations targeting said first virtual device by referring to a bitmap table maintained in the primary storage system to determine if a targeted logical block address has yet been migrated to the second logical device, wherein said primary storage system is configured to periodically access the first logical device in the external storage system to determine whether a throughput in response to an access request has decreased, and wherein said throughput of the external storage system is measured by read performance in response to the access request that decreases by said predetermined amount based on a need of the external storage system to reconstruct read data using parity information to retrieve the read data.

15. An information system according to claim 14, wherein said primary storage system includes a third logical device defined on said primary storage system as a cache device, wherein, prior to the failure of said external disk, when said primary storage system receives write data targeting said virtual device, said primary storage system writes the write data to said third logical device instead of to said first logical device.

16. An information system according to claim 14, wherein said primary disk controller comprises:

a primary input/output (I/O) function that processes I/O requests from said host and creates logical devices from said disks included in said primary storage system;

a virtualization function that creates the virtual devices using the logical devices in said at least one external storage system, a migration function that copies data in a logical device or virtual device in said primary storage system to another logical device or virtual device in said primary storage system while said primary storage system receives I/O requests from said host, and a primary management function that communicates with an external management function in said external storage system and operates said primary storage system in accordance with information from said external management function.

17. An information system according to claim 14, wherein said external storage system further includes a spare external disk that replaces said failed one of said external disks following failure.

18. An information system according to claim 14, wherein to manage logical devices and virtual devices, said primary and external disk controllers manage configuration information of said primary and external storage systems.

19. An information system according to claim 14, wherein when said information system includes at least two external storage systems a switch is provided to route accesses to respective external storage systems.

20. An information system according to claim 14, wherein said primary storage system includes a third logical device defined on said primary storage system as a cache device, wherein, prior to the failure of said external disk, when said primary storage system receives write data targeting a logical block address on said virtual device, said primary storage system writes the write data to said third logical device instead of to said first logical device, wherein when said primary storage system receives a read request targeting said virtual device, said primary storage system determines from a bitmap table maintained in the primary storage system whether to read requested data from the third logical device or from the first logical device.

21. An information system according to claim 14, wherein the primary storage system is configured to periodically access the first logical device in the external storage system according to a scheduled time period.

22. An information system comprising:

a primary storage system, said primary storage system including a primary controller;

a plurality of external storage systems, each said external storage system having an external disk controller and a plurality of external disks for storing data, said external disks being configured in a RAID configuration to provide redundant protection against data loss in the event of failure of one or more of the external disks, wherein said primary storage system uses virtual devices to treat logical devices in said external storage systems as if they are logical devices in said primary storage system;

a first logical device formed in a first said external storage system from the plurality of said external disks, said first logical device being used by said primary storage system to create a first virtual device in the primary storage system; and a network connecting said primary storage system and said plurality of external storage systems for communication, wherein the primary storage system periodically checks I/O performance of the first external storage system by periodically accessing the first logical device that is used by said primary storage system for the first virtual device, wherein the primary storage system assumes that one of said plurality of external disks that forms a part of the first logical device in said first external storage system has failed when the I/O performance has decreased by a predetermined amount, wherein, when said primary storage system assumes that one of the plurality of second disks that forms a part of the first logical device has failed, said primary storage system migrates data from the first logical device of said first external storage system to a second logical device in a second said external storage system, said second logical device being used by said primary storage system to form a second virtual device, wherein said primary storage system is configured to periodically access the first logical device in the external storage system to determine whether a throughput in response to an access request has decreased, and wherein said throughput of the external storage system is measured by read performance in response to the access request that decreases by said predetermined amount based on a need of the external storage system to reconstruct read data using parity information to retrieve the read data.

23. An information system according to claim 22, wherein said external storage system further includes a spare external disk that replaces said failed one of said external disks following failure.

24. An information system according to claim 22,
wherein said primary storage system includes a third logical device defined on said primary storage system as a cache device,
wherein, prior to the failure of said external disk, when said primary storage system receives write data targeting a logical block address on said virtual device, said primary storage system writes the write data to said third logical device instead of to said first logical device,
wherein when said primary storage system receives a read request targeting said virtual device, said primary storage system determines from a bitmap table maintained in the primary storage system whether to read requested data from the third logical device or from the first logical device.

25. An information system according to claim 22, wherein the primary storage system is configured to periodically access the first logical device in the external storage system according to a scheduled time period.

* * * * *